Aug. 5, 1930.  F. L. LEE ET AL  1,772,186
DUPLICATING PUNCHING DEVICE
Filed June 3, 1925    15 Sheets-Sheet 10
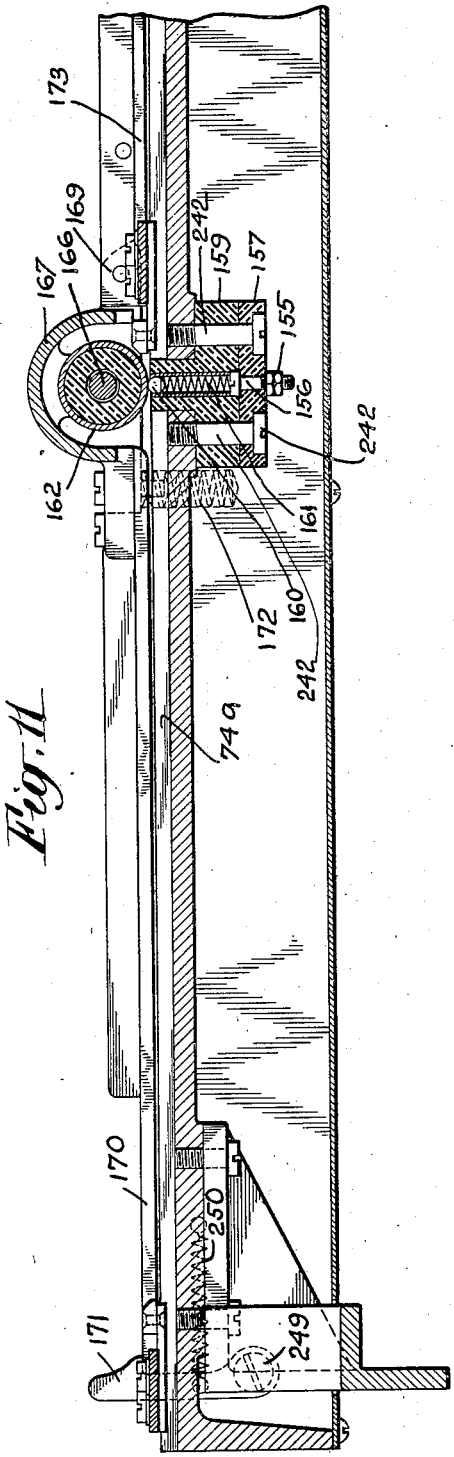
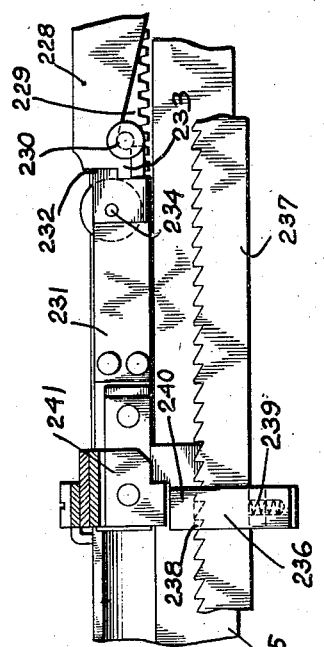
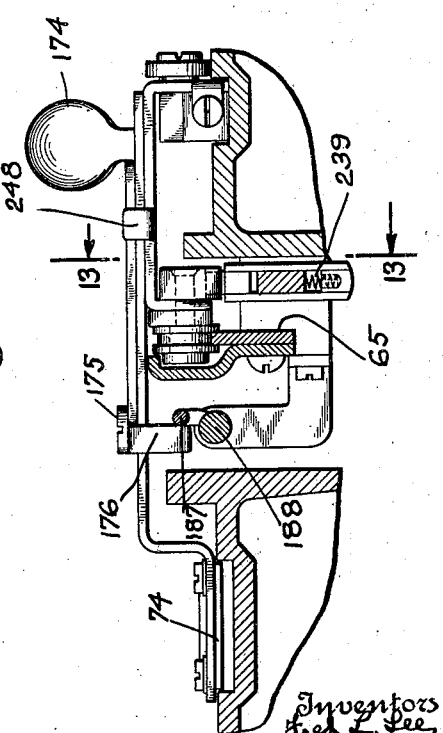
Inventors
Fred L. Lee
and
Burdett H. Phillips
By their Attorneys
Cooper, Kerr & Dunham

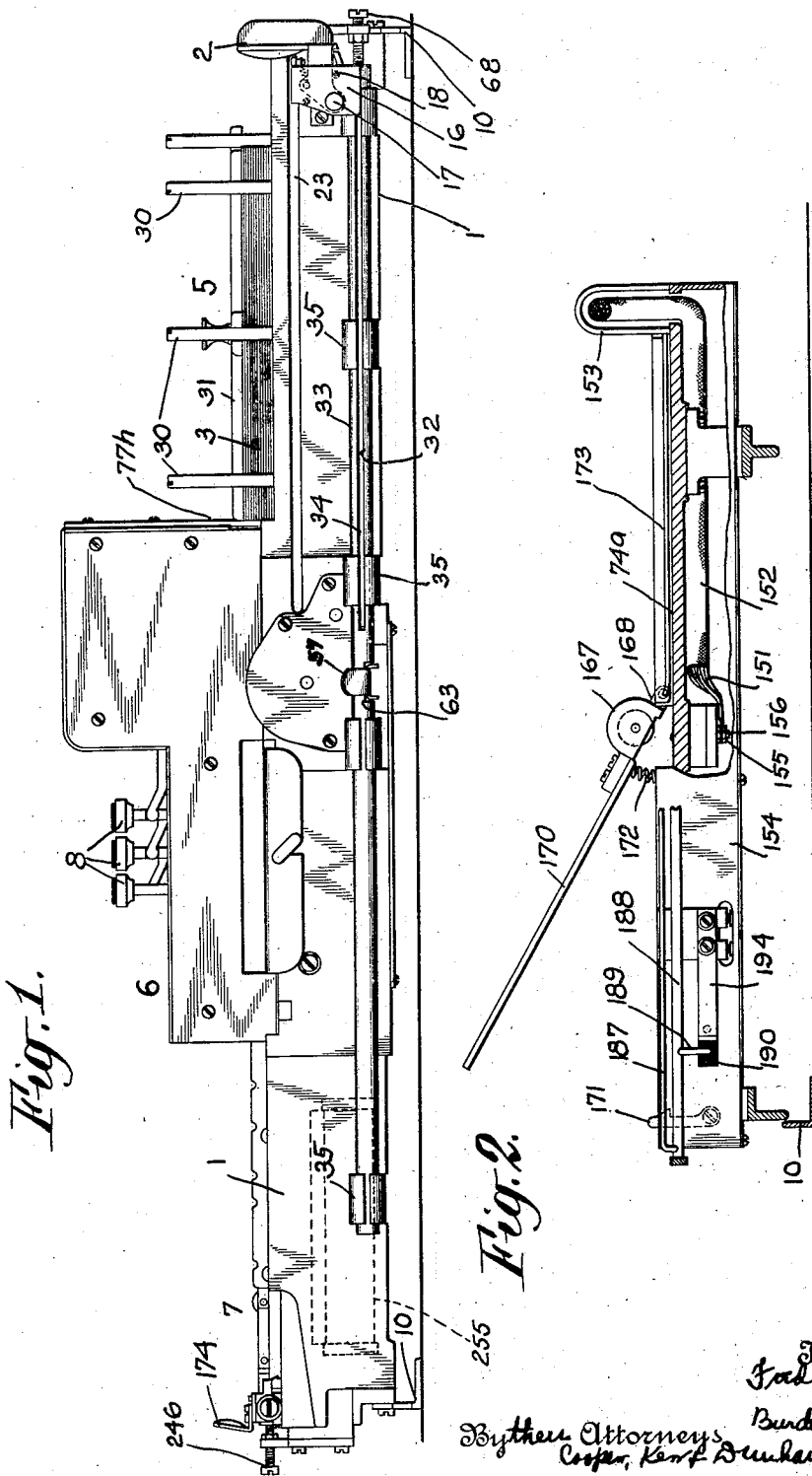

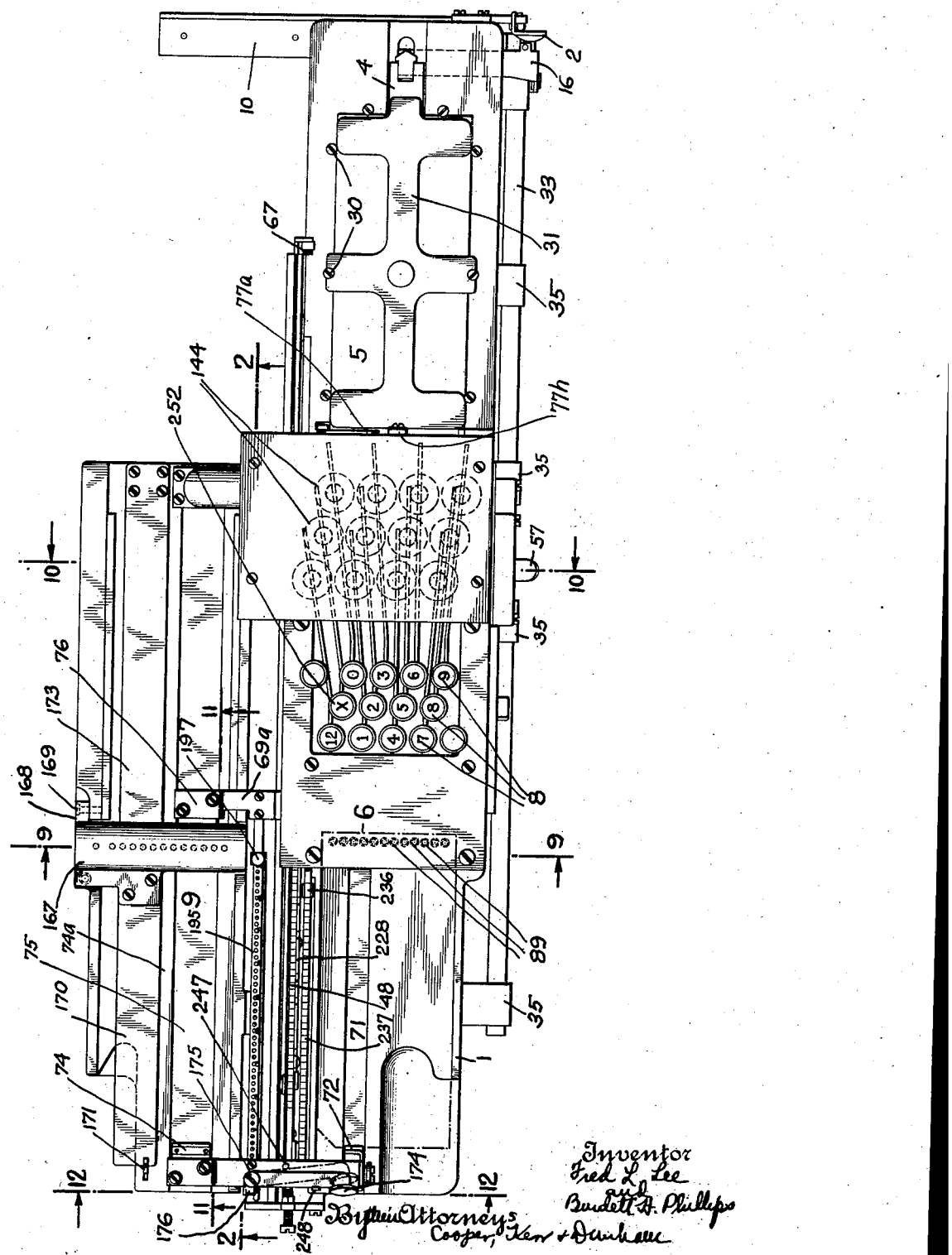

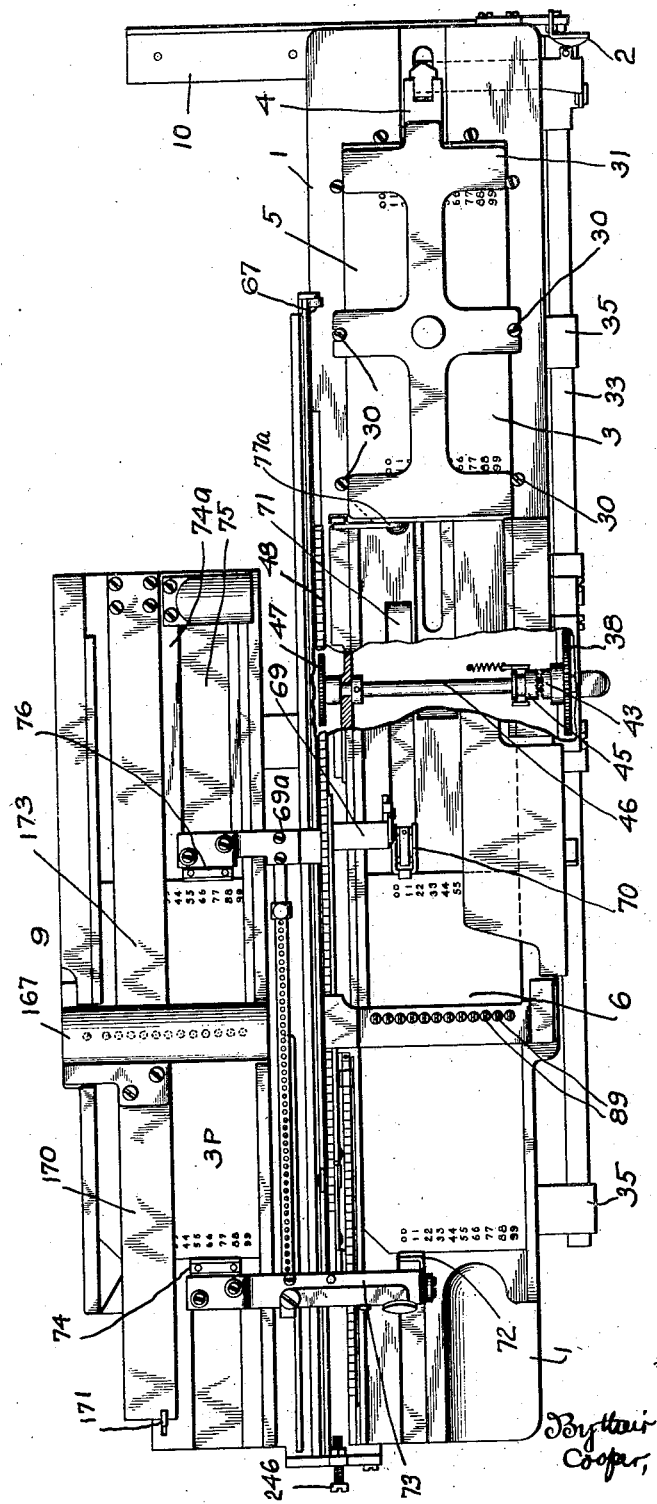

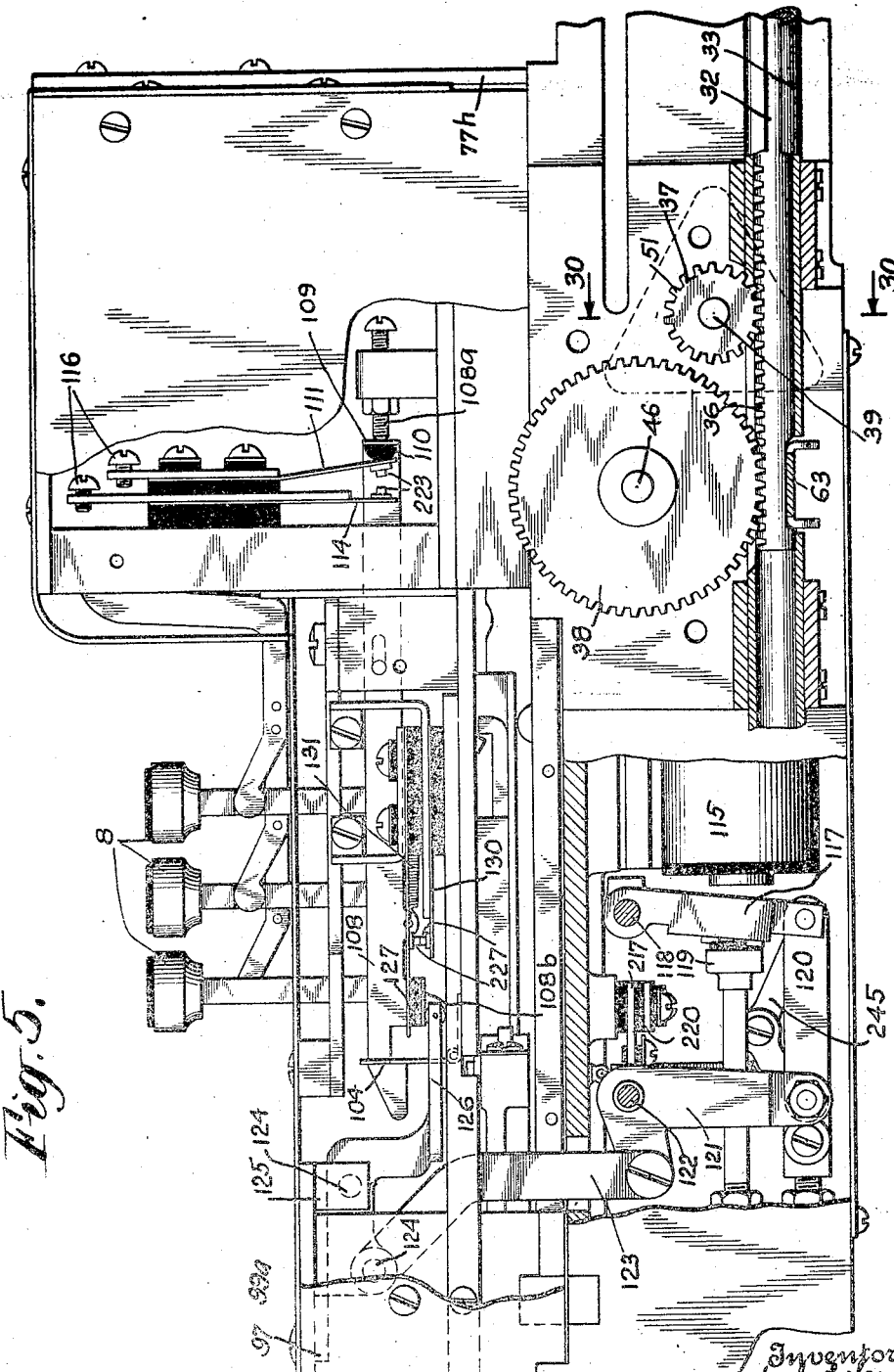

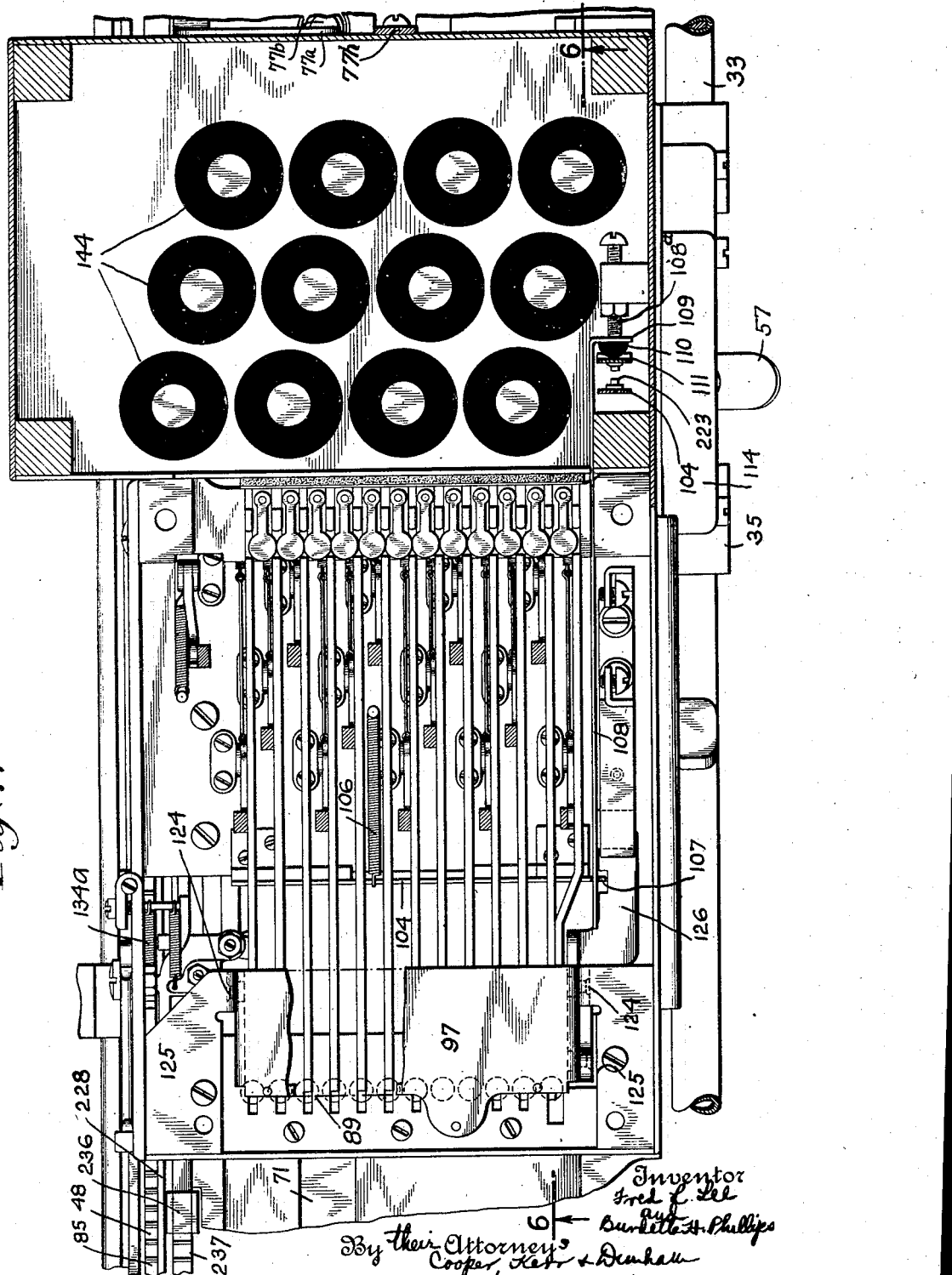

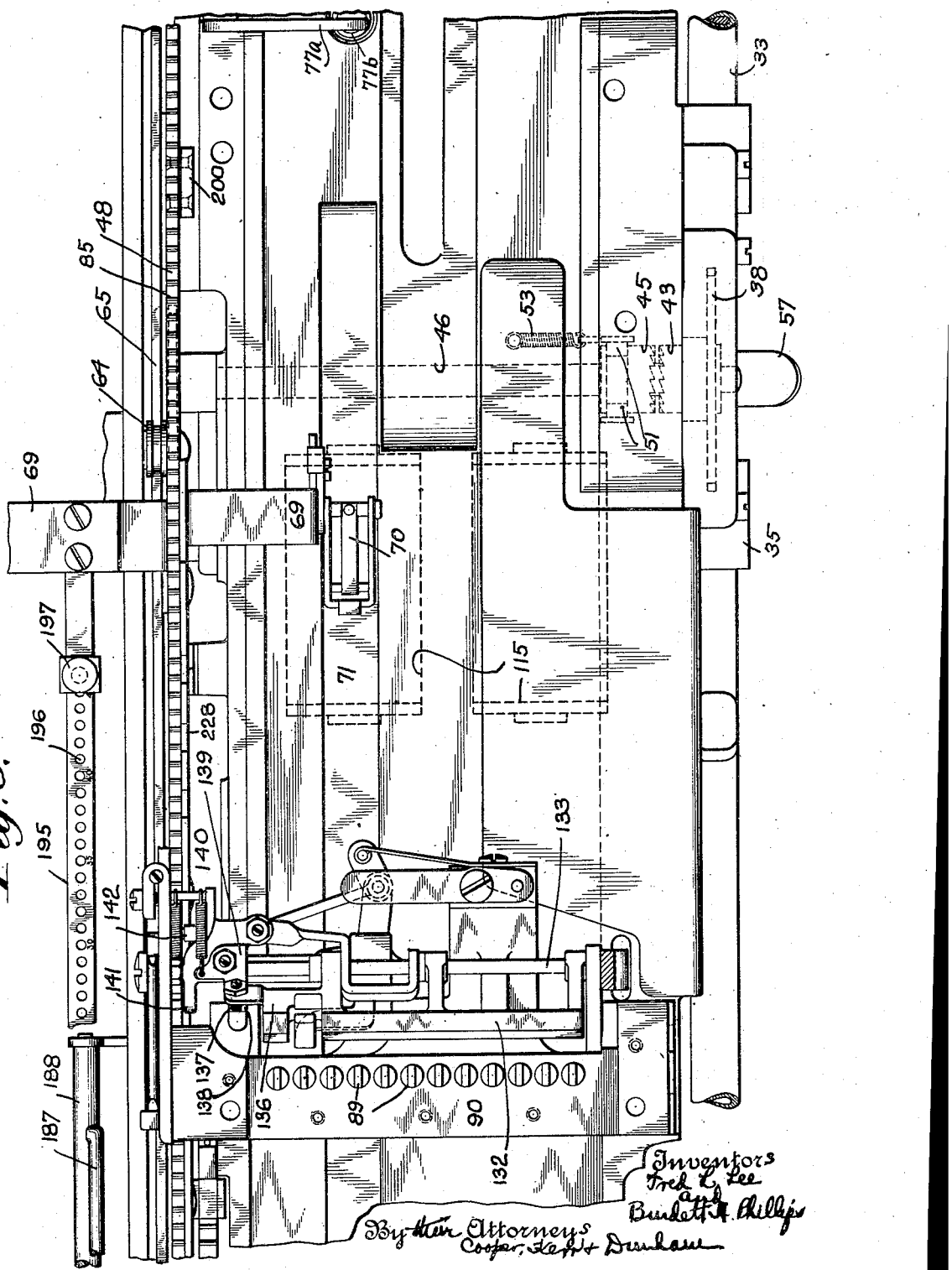

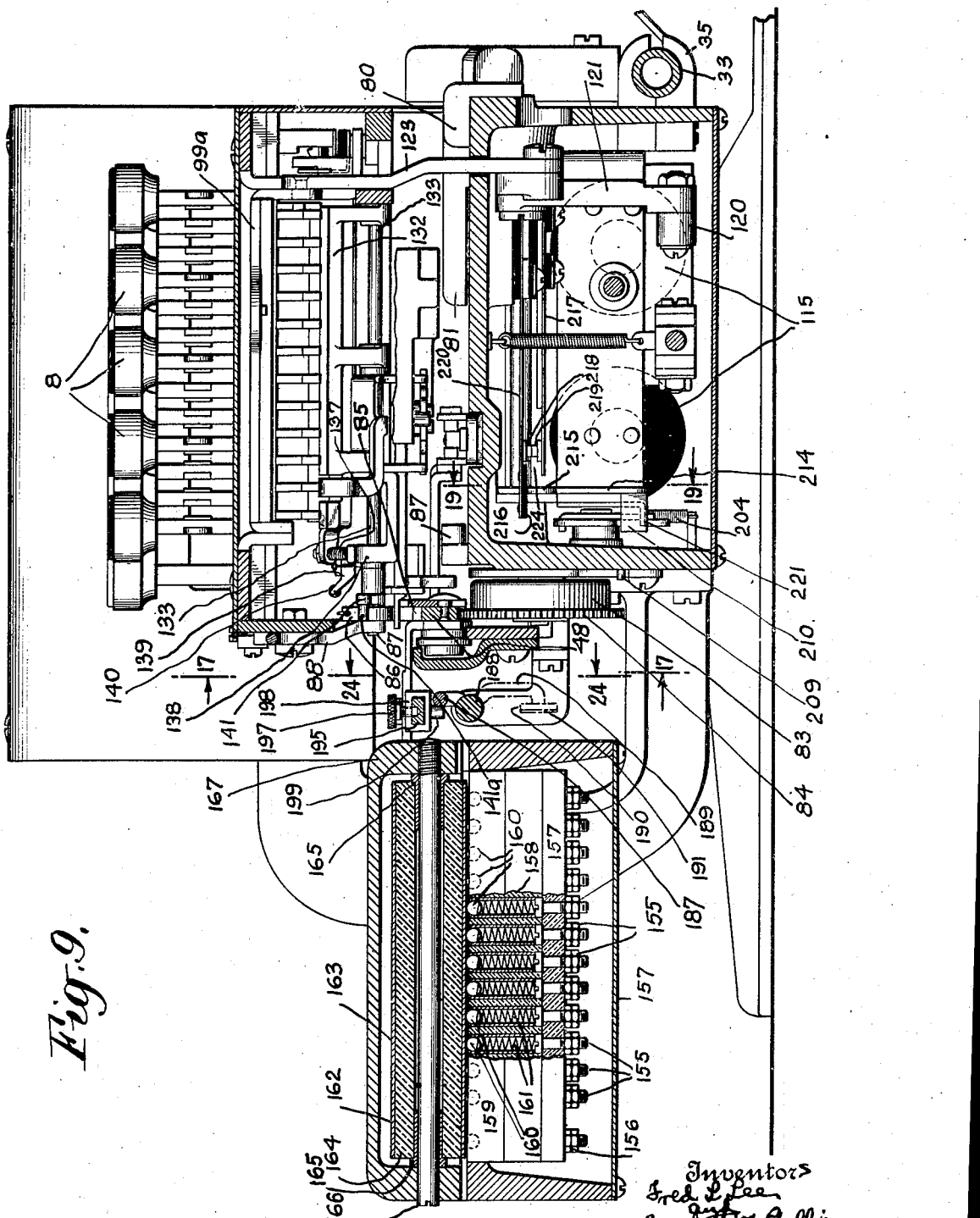

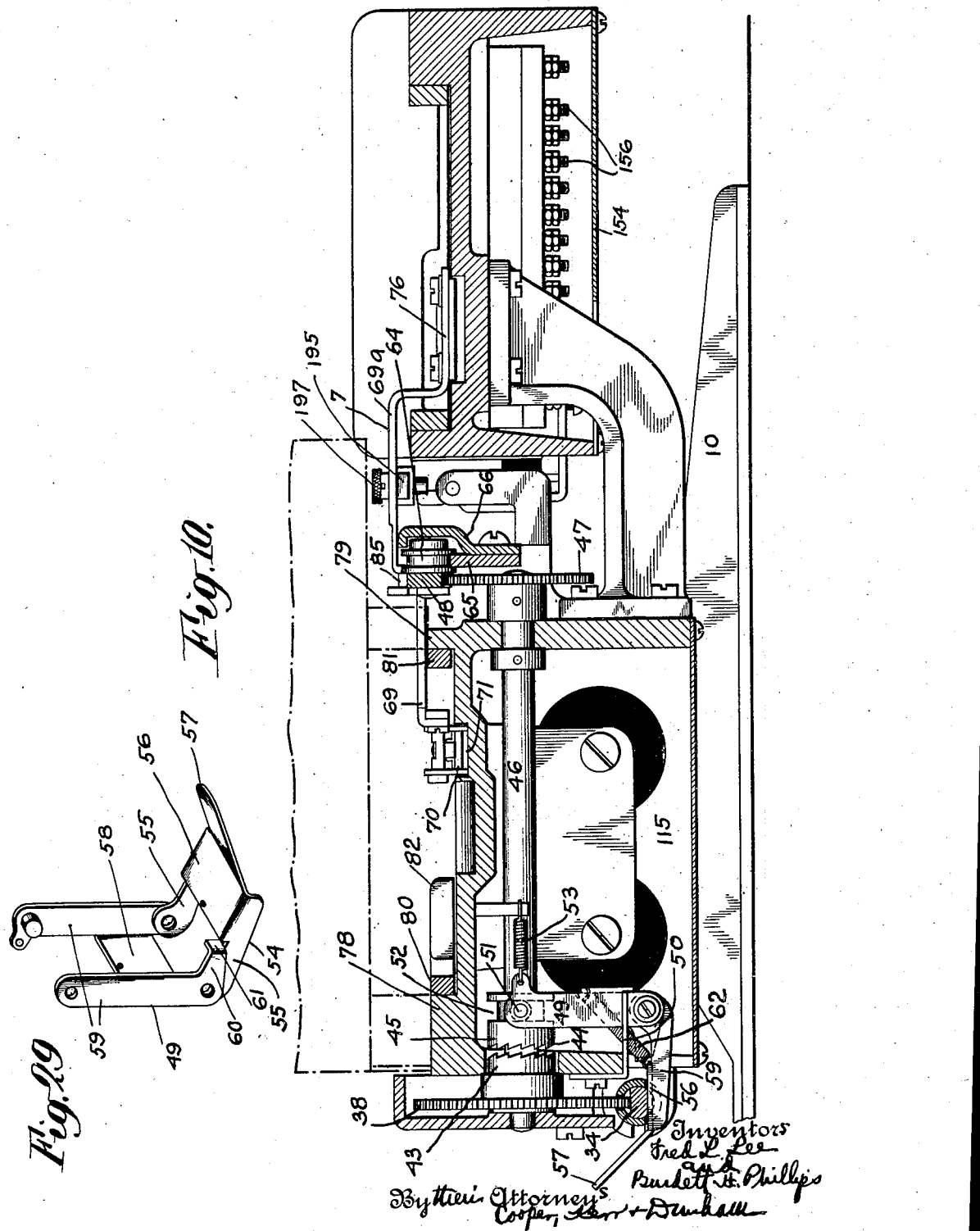

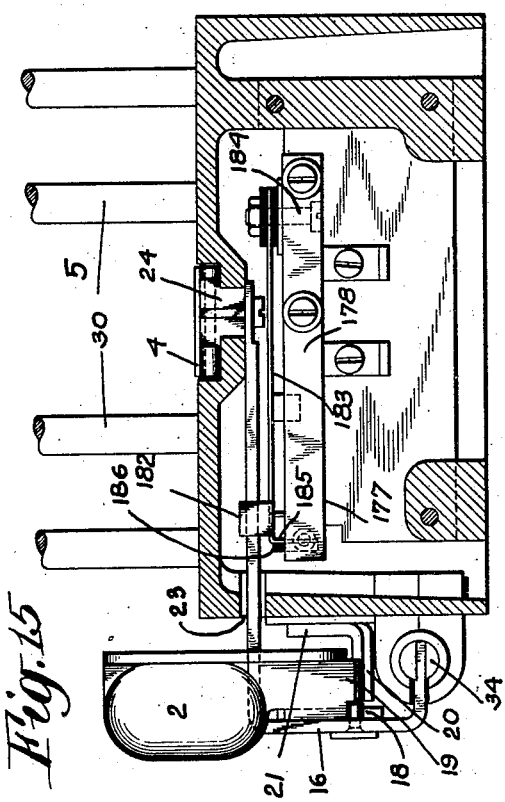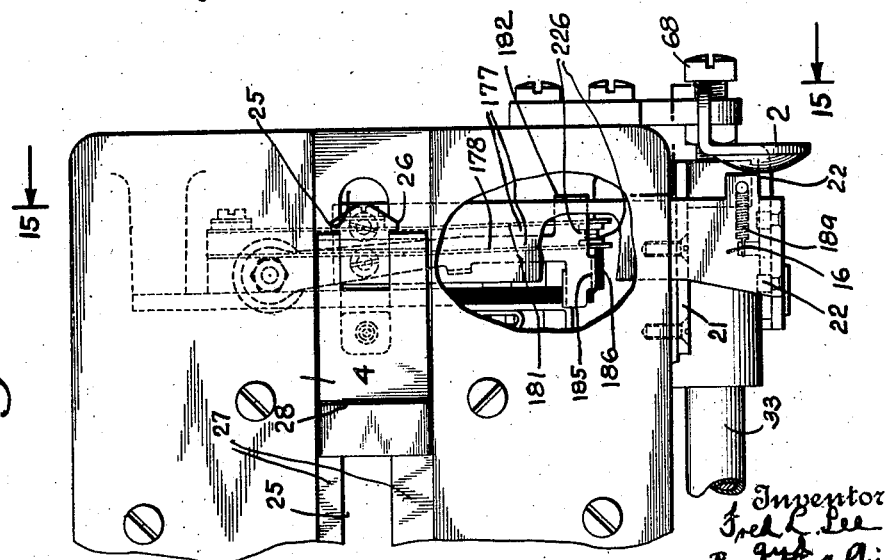

Aug. 5, 1930.  F. L. LEE ET AL  1,772,186

DUPLICATING PUNCHING DEVICE

Filed June 3, 1925   15 Sheets-Sheet 12

Inventors
Fred L. Lee
and
Burdett T. Phillips
By their Attorneys
Cooper, Kerr & Dunham

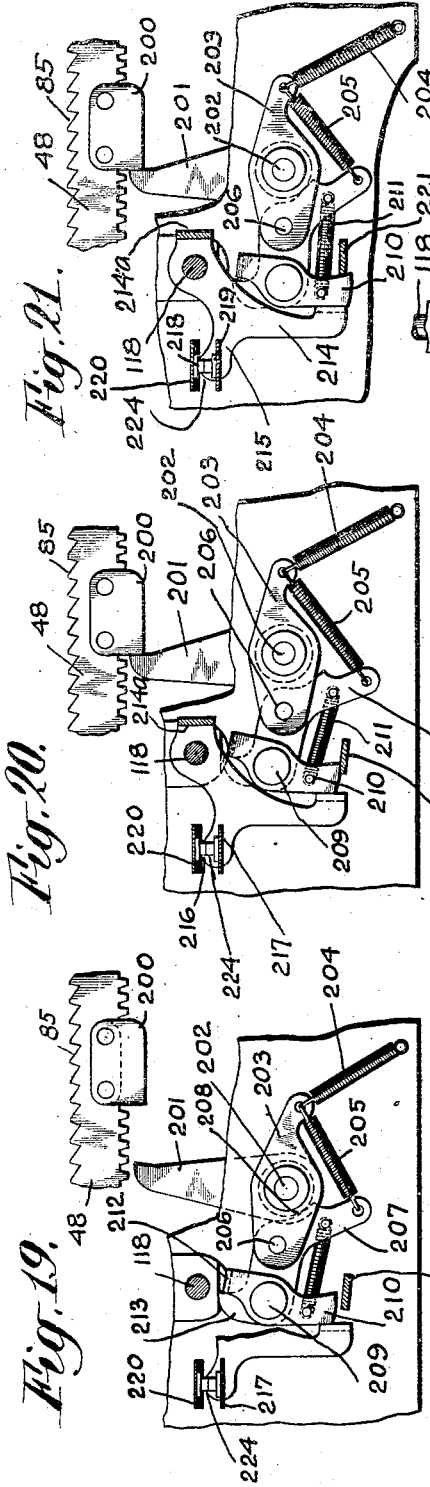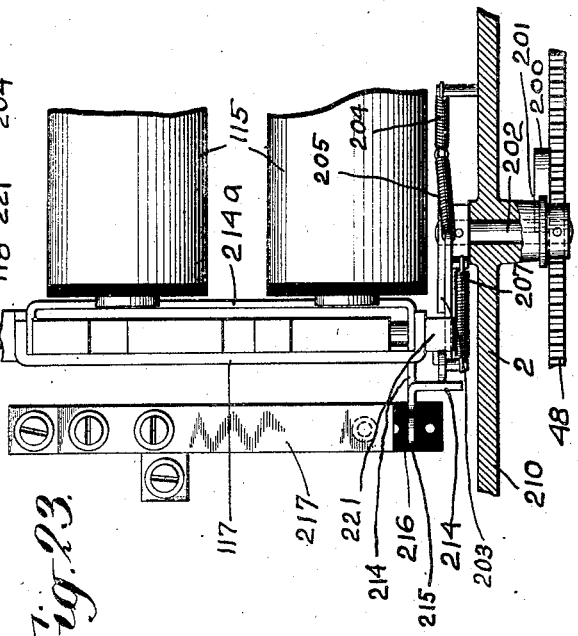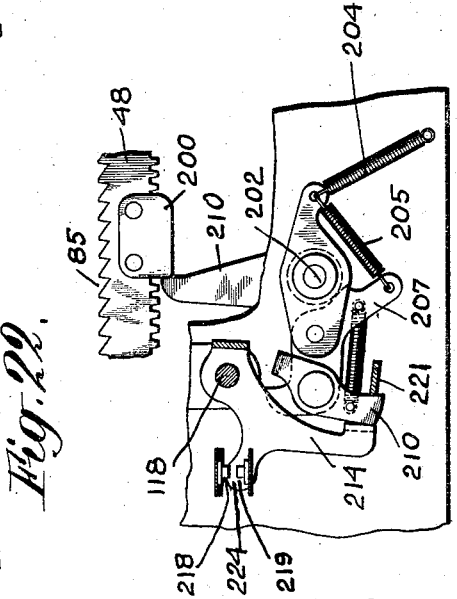

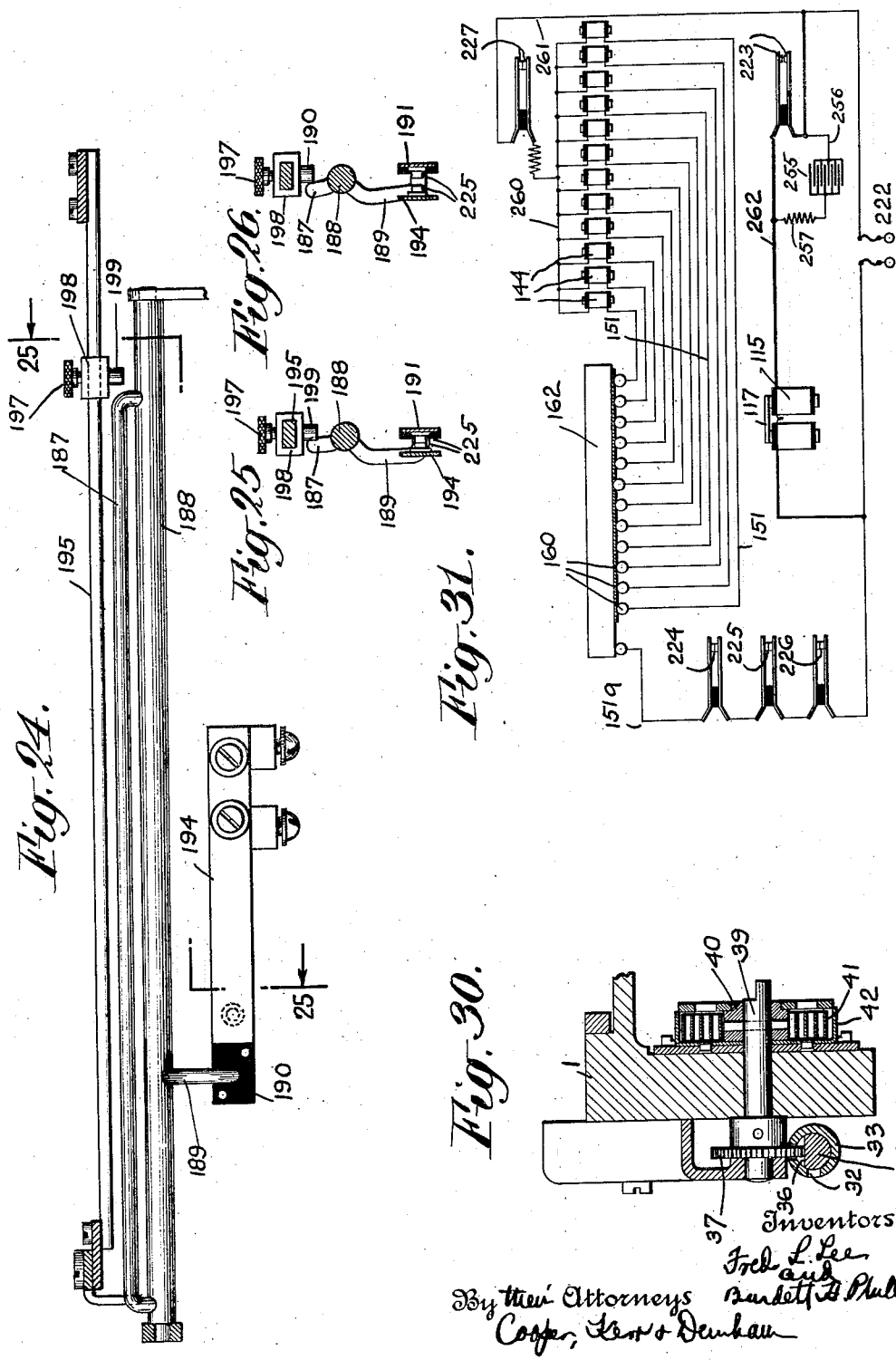

Aug. 5, 1930.  F. L. LEE ET AL  1,772,186
DUPLICATING PUNCHING DEVICE
Filed June 3, 1925  15 Sheets-Sheet 15

Inventors
Fred L. Lee
and
Burdett A. Phillips
By their Attorneys
Cooper, Kerr & Dunham Patented Aug. 5, 1930

1,772,186

UNITED STATES PATENT OFFICE

FRED L. LEE, OF BINGHAMTON, AND BURDETT H. PHILLIPS, OF ENDICOTT, NEW YORK, ASSIGNORS TO THE TABULATING MACHINE COMPANY, OF ENDICOTT, NEW YORK, A CORPORATION OF NEW JERSEY

DUPLICATING PUNCHING DEVICE

Application filed June 3, 1925. Serial No. 34,516.

This invention relates to punching or perforating machines and more particularly to machines of the type in which the punching may be controlled either manually or by a previously punched card.

A general object of the invention is to provide an improved and simplified machine of the type specified.

Other objects are to provide a machine which requires less room for operation; a machine operable from the side; a machine arranged for convenient right hand operation; a machine in which the arrangement of the controlling circuits is very much simplified and improved; a machine in which the conductors connecting the duplicator with the punch selector magnets are housed in an improved manner and are given a fan arrangement as they pass to the detecting portion of the duplicator, a machine in which the duplicator circuit is broken when the last column of a card has been punched; means actuated by a handle at the right of the machine for advancing a card from a magazine to a position to be punched and moving in the opposite direction a carriage comprising a part to receive the card advanced from the magazine and another part to hold a pattern card; a handle on said carriage for moving the same into card punching position independently of the handle at the right of the machine; means actuable by said handle on the carriage, when used to return the carriage, for breaking the duplicator circuit and to become ineffective as soon as said handle is released; means to provide a gap in the duplicator circuit except when the handle for advancing the cards from the magazine and moving the carriage in the opposite direction, is in its home position; a duplicator so arranged that when a pattern card is removed from the duplicator the duplicator circuit will be rendered ineffective and, when a pattern card is placed in the duplicator and secured in position on the card carriage, the duplicator will be in condition to actuate the punching mechanism in accordance with the perforations in the pattern card; and means for automatically cutting out the duplicator when a predetermined column of the pattern card is reached.

Further important features are the provision of means to break the punch magnet circuit as soon as the selected punch has been operated, separate means for automatically cutting out the duplicator as soon as the armature is shifted and punching effected and maintaining this condition until the armature is restored to normal position; a keyboard in which the keys have a more direct action on the punching mechanism than heretofore; levers actuable by selector magnets and connected with the shanks of said keys for selectively actuating the punching mechanism; improved clutch mechanism normally ineffective but rendered effective to feed the card carriage into the punching mechanism when a card is advanced from the magazine; means for detachably supporting a skip bar on the escapement rack, and means to determine the first column in which punching is to be effected.

Other features and advantages will hereinatfer appear.

In the drawings,

Fig. 1 is a side elevation.

Fig. 2 is a section taken on the line 2—2 of Fig. 3.

Fig. 3 is a top plan view of the complete punching and duplicating mechanism.

Fig. 4 is a view similar to Fig. 3 but with parts omitted or broken away to show the underlying structure.

Fig. 5 is a side elevation of the central portion of the machine, parts being broken away to show the underlying structure.

Fig. 7 is a section along the line 7—7 of Fig. 6.

Fig. 8 is a top plan view of the structure below the line 8—8 of Fig. 6.

Fig. 9 is a section along the line 9—9 of Fig. 3.

Fig. 10 is a section along the line 10—10 of Fig. 3 with certain parts removed.

Fig. 11 is an enlarged section along the line 11—11 of Fig. 3.

Fig. 12 is a partial sectional view along the line 12—12 of Fig. 3.

Fig. 13 is a section along the line 13—13 of Fig. 12.

Fig. 14 is a detail top plan view of certain of the contact devices and coacting parts.

Fig. 15 is a section along the line 15—15 of Fig. 14.

Fig. 16 is a side elevation of the structure shown in Fig. 14.

Fig. 19 is an enlarged detail sectional view taken on line 19—19 of Fig. 9 and showing in their normal positions parts of the device for breaking the duplicator circuit as soon as the last row of a card is punched.

Fig. 20 is a view showing the parts in the positions assumed when the card reaches the position for punching.

Fig. 21 is a view showing the parts in the positions assumed after the punch magnet has been energized.

Fig. 22 is a view showing the parts in the positions assumed when the punch magnet has been deenergized after the punching operation.

Fig. 23 is a top plan view of the parts shown in Fig. 19.

Fig. 24 is a detail view of means for breaking the duplicator circuit when a certain column is reached. The view is taken substantially on line 24—24 of Fig. 9 with certain non-related parts removed.

Fig. 25 is a section on the line 25—25 of Fig. 24.

Fig. 26 is a view similar to Fig. 25 but showing the circuit broken.

Fig. 29 is a perspective detail view of means for shifting a clutch taken in the direction of arrow 29—29 on Fig. 6.

Fig. 30 is a section along the line 30—30 of Fig. 5.

Fig. 31 is a wiring diagram of the circuits employed.

Figure 6:
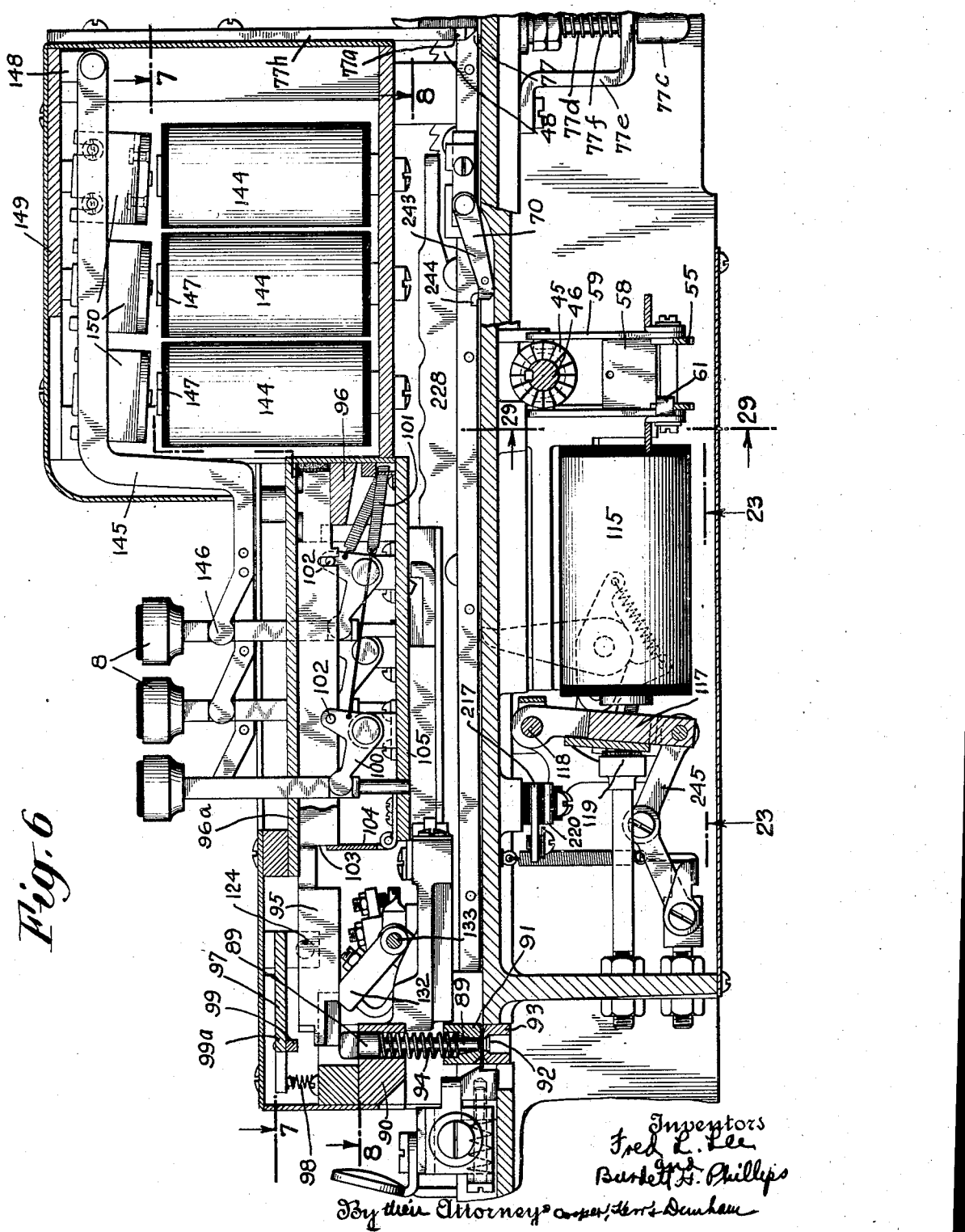
Fig. 6 is a section along the line 6—6 of Fig. 7.

The machine comprises a main frame 1 and is arranged for convenient right hand operation by a handle 2 having a normal position at the right hand end of the machine and being mounted for leftward movement along the side of the machine. Whenever the handle 2 is moved to the left in this manner, a statistical card 3 is withdrawn by a picker 4 from the bottom of a pack in a magazine 5 and advanced to be operated upon by punching mechanism 6. Such leftward actuation of the handle 2 also serves to move a card carriage 7 to the right to a position to receive the card 3 when the picker 4 reaches the end of its leftward movement. The card is then punched column by column as required and the card carriage moved step by step to the left. When the punching of the card is completed and the carriage 7 has reached the end of its movement, the punched card may be removed and the operation repeated.

The punching mechanism 6 may be operated normally by means of numeral keys 8 or may be controlled by a duplicator 9 in accordance with the perforations of a pattern member which may be a previously punched card 3. Such pattern member is supported by the card carriage 7 and is moved through the duplicator concomitantly with the movement of a card through the punching mechanism. Instead of feeding cards one by one from the magazine 5, a card to be punched may be placed in the card carriage when in its leftward position and the carriage moved to the right to place the card in position to be punched or perforated. This operation can be effected without in any way effecting withdrawal of cards or any action on the cards in the stack.

Figure 18:
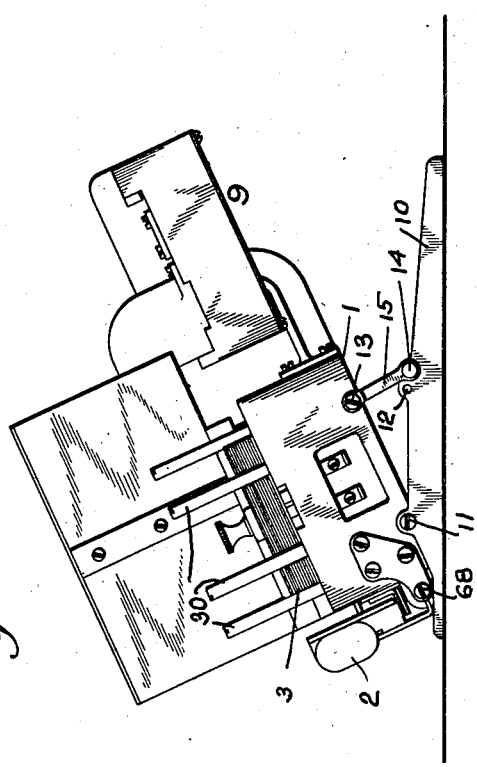
Fig. 18 is an end elevation showing the machine in tilted position on the base.

The main frame 1 is supported at its ends on feet 10. Under certain conditions it may be desirable to have the main frame supported in horizontal position and under other conditions it may be desirable to have the main frame tilted toward the operator to enable him to observe the operation of the machine to better advantage. To meet such requirements each foot 10 is pivotally connected near its forward end with the main frame 1 by any suitable means such as a screw 11 passing through an opening in the upright flange of the foot and threaded into said main frame 1. Farther to the rear the foot is provided with an opening 12 through which a screw 13 may be passed into a suitable threaded opening in the main frame when the latter is in horizontal position. The foot is also provided adjacent the opening 12 with a pivot 14 on which is mounted a link 15 of suitable length and having an opening adjacent its free end. When it is desired to have the main frame in inclined position as shown in Fig. 18, the screws 13 are withdrawn and, after placing the links 15 in proper positions, passed through the openings at the free ends of the links and screwed into the same threaded openings as before.

The handle 2 is mounted at its left end (Fig. 16) on a bracket 16 and at the rear face thereof by means of a pivot 17 and is normally held in depressed position against a stop 18 on the bracket by gravity or by means of a spring 18ª attached at one end to the handle and at the other end to the bracket. At the right of the bracket 16, the handle 2 is offset rearwardly, then to the right and upwardly and finally forwardly to provide a finger engaging portion. The rearward offset portion is provided at its lower edge with a tooth or stop 19 which is normally in position to engage the right hand edge of a stop 20 projecting forwardly from a bracket 21 secured to the main frame. The stop 20 serves to prevent accidental movement of the handle 2 and consequent actuation of mechanism operable thereby. When, however, the handle 2 is pressed to the left it swings upwardly to raise the stop 19 above the stop 20 and upon engagement with a stop 22 on the bracket 16 serves to move the latter to the left. The stop 20 is inclined downwardly to the left so that in the return movement of the handle 2 the stop 19 will engage the inclined upper surface of the stop 20 and ride over such stop finally dropping into a locking position at the right thereof.

Above the bracket 21, the bracket 16 is provided with a rearward extension passing through a slot 23 in the side of the main frame and having secured thereto at its upper face a block 24 slidable in a slot 25 in the frame and having ears 26 overlying ledges 27 formed at the sides of the slot. Pivoted on the block 24 is the picker 4 having an inclined end which extends beneath the adjacent end of the magazine when the picker is in retracted position and a shoulder 28 projecting upwardly to a sufficient extent to remove one card 3 from the bottom of the pack in the magazine 5. The picker 4 is normally urged upwardly by a spring 29 (Fig. 16) so that, when there are cards in the magazine, the inclined portion of the picker 4 will be yieldingly pressed against the lowest card to assure engagement of the shoulder 28 with the adjacent end of the lowest card when the picker is advanced from its retracted portion. The adjustment of the tension of spring 29 can be varied by means of the adjustable screw 29ª.

The upper surface of the frame forms a table, part of which is utilized as the bottom of the card magazine 5 which also comprises posts 30 arranged to hold the cards 3 in proper position. To assure engagement of cards by the picker irrespective of the number of cards in the magazine provision is made of a weight or follower 31 guided by a pair of the posts 30 located at substantially the middle of the magazine. In its preferred form the follower is formed with a longitudinal central portion and cross members, notches being formed at the opposite ends of one of said cross members to receive the posts of such middle pair and the central member being extended sufficiently to the right of the machine to overlie at all times the shoulder 28 of the picker.

The handle 2 may also be used to actuate the card carriage 7. To this end the bracket 16 is turned back beneath the pivot 17 and extends through a longitudinal slot 32 in a tube 33 and is secured to a rod 34 slidable in said tube. The slot 32 is of sufficient length to permit the necessary movement of the handle 2 and the tube 33 is supported on the main frame 1 by slotted brackets 35 as shown in Fig. 1. Adjacent the extreme leftward position of the handle 2, the tube 33 is cut away at the top to permit teeth 36 on the upper side of the rod to mesh with the teeth of a pininon 37 and a gear 38. The pinion 37 is mounted on a shaft 39 on which is fixed a hub 40 connected by a spiral spring 41 with a cup 42 secured to the frame 1. As the handle 2 is moved to the left, the spring 41 is placed under tension and upon the release of the handle 2 acts to return it to its normal position.

The gear 38 is suitably supported for rotation and is fixed to a member 43 of a clutch 44 whereby motion may be transmitted to the card carriage 7 when the handle 2 is moving to the left. Opposed to the member 43 is another clutch member 45 having a driving connection with a shaft 46 and slidable therealong into and out of engagement with the member 43. At its other end the shaft 46 is provided with a gear 47 fixed thereon and meshing with teeth on the lower edge of a rack 48 which may be considered as forming a part of the card carriage 7.

To control the clutch member 45 provision is made of a yoke 49 pivotally supported by means including a bracket 50 fixed on the main frame, and having at its free end elements 51 projecting into the groove 52. The yoke 49 is urged in a clutch breaking direction by a spring 53 and is also controlled by means of a yoke 54 pivoted to turn about the same axis as yoke 49. The yoke 54 comprises two arms 55 joined by a cross member 56 which may have an upturned finger piece 57 thereon and the yoke 49 comprises a cross member 58 and at opposite ends thereof arms 59 one of which has adjacent its pivotal axis an extension 60 perpendicular thereto and having at its end a lug 61 overlying the adjacent arm 55 of the yoke 54. Joining the cross members 56 and 58 is a spring 62 having a greater effect than spring 53, so that upon depression of the finger piece 57 or cross member 56 the clutch member 45 will be shifted to operative position. In this connection it should be noted that the teeth of the clutch members 43 and 45 are so inclined that when in operative relation a leftward movement of handle 2 will transmit through means including the clutch 44 power to move the card carriage 7 to the right to receive a card 3 positioned by the picker 4 in the punching mechanism 6. If, however, the handle 2 is moved to the right the teeth of the clutch members 43 and 45 will ride over each other and force the clutch members apart.

The clutch 44 is controlled by the rod 34 and to this end the cross member 56 of the yoke 54 extends through a notch in the tube 33 and engages the lower surface of the rod 34. When the rod 34 is in its retracted position the cross member 56 lies in a notch 63 in the bottom of the rod 34 and the spring 53 is effective to disconnect the clutch. This enables actuation of the card carriage while the picker mechanism remains at rest. The notch 63 has an inclined wall at the right so that, upon movement of the handle 2 to the left, the cross member 56 will be depressed and the clutch member 45 moved into operative relation with clutch member 43.

Due to the engagement of the rod 34 with the lower side of gear 38 and of the rack 48 with the upper side of the gear 47 movement of the picker 4 to the left with a card for presentation to the punching mechanism 6 will be accompanied by a rightward movement of the card carriage 7 into a position to receive the card from the picker 4. As indicated in Fig. 10 the rack 48 is carried by means of grooved rollers 64 running on a rail 65 mounted in the main frame and an adjacent member 66 with a flange overlying the heads of the studs which carry the rollers 64. The movement of the carriage 7 to the right may be limited by means of a suitable stop 67 in the path of the end of the rack 48. The retracted position of the rod 34 may also be determined accurately by means including an adjusting screw 68 in the path of the right hand end of the rod.

In addition to the rack 48 the card carriage comprises a forwardly projecting arm 69 having at its forward end a device 70 to engage the rear edge of a card 3 in its passage through the punching mechanism 6. Such device 70 when in effective position with respect to the rear edge of a card lies in a groove 71 which also receives a device 72 to engage the forward edge of a card in the card carrier and supported on a member or arm 73 which is secured to the rack 48 and extends to the rear thereof to support a device 74 for engaging the forward edge of a card resting on the top of the duplicator which forms a table 74$^a$. The device 74 travels in a groove 75 in the table 74$^a$ and this groove also serves to receive a device 76 for holding the other end of the pattern card and which is mounted on the rear end of an arm 69$^a$ secured to the rack 48 at its rear face.

Upon engagement of the rear end of the bottom card in the magazine 5 by the shoulder 28 of the picker, such card is advanced through the throat 77 which is an opening of such width as to permit the ready passage of one card and prevent the passage of more than one card at a time.

Figure 33:
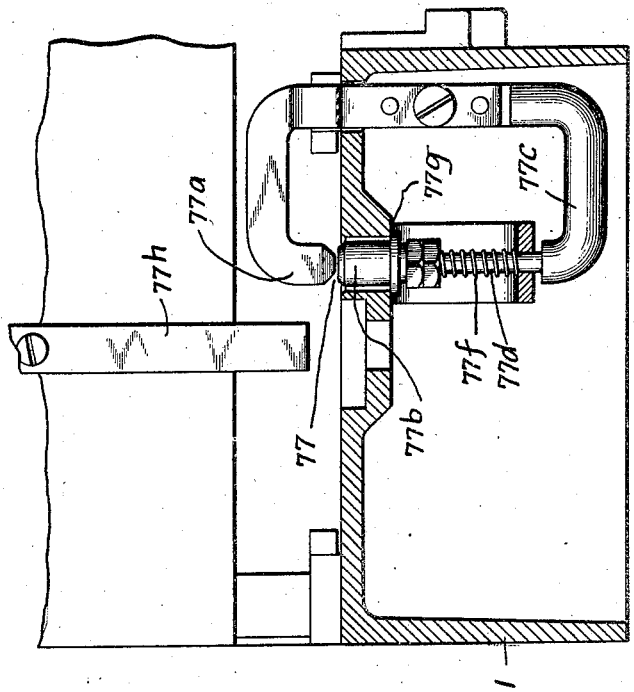
Figs. 32 and 33 are details of the floating throat.
Figure 32:
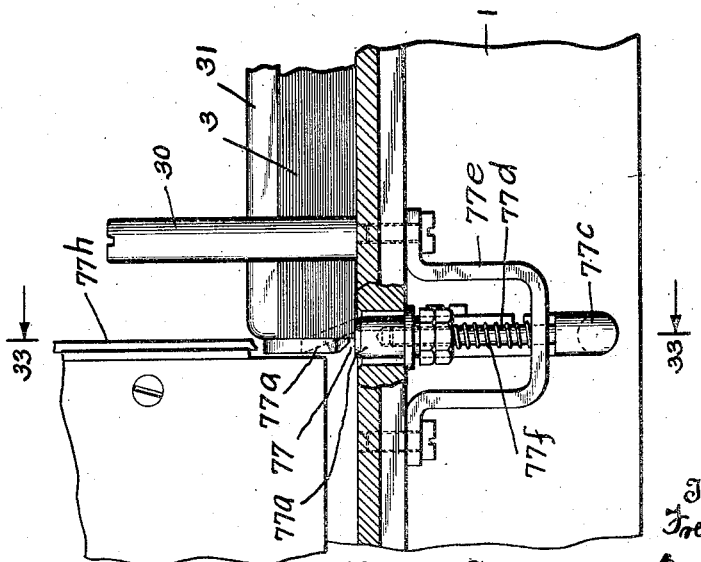

It frequently happens that the cards are slightly warped from their true shape and in order to facilitate the feeding of such cards the throat 77 is made "floating". This is accomplished by forming the throat between an upper plate 77$^a$ and a lower shoe 77$^b$ (Figs. 32 and 33) both forming integral parts of the link shaped member 77$^c$, the upper portion of which comprises the plate 77$^a$ and the lower portion of which carries a vertical stem 77$^d$ threaded at its upper end to carry the throat shoe 77$^b$, which is threaded internally and therefore adjustable on stem 77$^d$ relatively to plate 77$^a$ to vary the size of the throat if necessary. Member 77$^c$ is supported by bracket 77$^e$ and is pressed upwardly by coil spring 77$^f$. Its upward travel is limited by collar 77$^g$.

In operation the forward edge of the stack of cards 3 rests on shoe 77$^b$. If the cards are flat the top surface of 77$^b$ is flush with the bottom of the magazine floor. The same is true if the cards are bent concave downwardly. If, on the other hand, the cards are bent concave upwardly to such an extent that the weight of plate 31 is not sufficient to flatten them out, then the front edge of the cards will be off the floor of the magazine and it would be impossible to feed them through the ordinary type of rigid throat because the edge of the card would not be opposite the throat opening. In the present construction, however, shoe 77$^b$ urged upwardly by spring 77$^f$ remains in contact with the bottom of the card, thus maintaining the throat always in proper position to pass the bottom card from the stack. Plate 77$^h$ is a guide or stop to maintain in proper position the front face of the card stack. In advance of the card magazine the table or top of the main frame is provided with raised portions 78 and 79 respectively to guide the side edges of the cards advanced from the magazine 5. Provision is also made adjacent such raised portions of members 80 and 81 overlying the surface of the table to hold the card flat. Under the punching mechanism there is provided a removable plate 82 which holds the cards flat during their passage through the punching mechanism. This plate can be removed to withdraw cards which may become lodged in the punching section of the machine.

When it is desired to punch the lowest card in the magazine 5, the handle 2 is moved to the left to advance the picker 4 and move such card into the punching mechanism. As soon as the movement of the rod 34 to the left is begun the inclined right wall of the notch 63 will cam down the cross member 56 and shift the clutch member 45 into engagement with the clutch member 43 thus connecting the gears 38 and 47 so that the leftward movement of the rod 34 will effect a movement of the rack 48 and carriage 7 in the opposite direction to a position to receive the card from the picker 4, the card passing beneath the device 70 (Fig. 6) to a position to be engaged operatively thereby. Such rightward movement of the rack 48 is effected against the action of a spring drum 83 connected directly with a gear 84 meshing with the teeth on the lower side of said rack 48.

The top of the rack 48 is also provided with teeth 85 inclined toward the left end of the machine and when the carriage 7 has reached the limit of its movement it is held there by engagement of one of said teeth by a stepping pawl or dog 86 loosely mounted on a pivot 87 in a bracket 88 mounted on a fixed part of the machine. At this time the first column of the card to be punched will lie beneath a row of punches 89 which have enlarged upper ends guided in a member 90 and lower ends extending through openings in a guide or stripper member 91 and immediately above openings 92 in a die plate 93.

The punches 89 are normally held in raised position by springs 94 interposed between the enlarged heads thereof and the stripper member which is provided with openings to receive the lower ends of said springs. Resting on the upper ends of said punches are interposers 95 supported at their rear ends on a cross member 96 and resting against the lower face of an overlying plate 96ª so that they prevent further upward movements of said punches. The interposers 95 are so notched at their forward ends that when they are in their normal positions depression of a plate 97 against a spring 98 will merely move member 99 of the depresser 99ª into such notches.

When, however, any numeral key 8 is depressed it will actuate a bell crank 100 against the tension of a spring 101, the forward arm of each bell crank having a rounded head fitting into a notch in the shank of the key and the upright end having a pin 102 in a slot in the lower edge of the corresponding interposer 95. Such interposer will then be advanced to such a position that depression of the member 99 will effect depression of the interposer and consequently of the corresponding punch.

At its lower edge, each interposer 95 has a notch providing a shoulder 103 against which rests a plate or universal member 104 pivoted at its lower edge on another horizontal plate 105 and normally drawn to the right by a spring 106 (Fig. 7) of the punching mechanism. Near the front or operating side of the machine the plate is provided with a notch 107 to receive a narrow portion of a link 108 having a hook portion to engage the forward face of the member 104. At its rear end the link 108 is provided with an offset 109 having on the front face thereof a button or the like 110 of insulating material to engage the rear face of a leaf spring 111 having a contact 223 thereon opposite a contact 223 on a leaf spring 114. Upon movement of any of the interposers 95, the rear contact 223 will be moved into contact with the front contact 223 thereby closing the circuit through a punch magnet 115. To obtain accurate positioning of the link 108 when retracted provision is made of an adjustable stop 108ª. As shown in Fig. 5 the leaf springs are insulated from the frame and from each other and may be connected by binding screws 116 with conductors forming part of the circuit of the punch magnet 115.

Upon energization of the punch magnet 115 in this manner the armature 117 will be swung about its pivot 118 away from the abutment or stop 119 and through the link 120 will rock the bell crank 121 about the pivot 122 to draw downward the link 123 and rock the plate 97 or depresser 99ª about the pivots 124 in brackets 125. The depresser comprises the plate 97 and at the ends thereof downwardly extending flanges through which pass the pivots 124 and of which one is extended to the right to form an arm 126 to engage a lateral projection 108ᵇ on the link 108 which is provided with insulating material to engage the lower face of a leaf spring 127 carrying an upper contact 227 normally in engagement with a lower contact 227 on a leaf spring 130. These leaf springs are insulated from each other and from the frame and are in the duplicator circuit. Upon operation of the punch magnet 115, the leaf spring 127 will be lifted thus breaking the duplicator circuit at the contacts 227 and the link 108 will be lifted sufficiently to release the same from the member 104 and permit its return under the influence of spring 106 thus opening the contacts 223.

Figure 17:
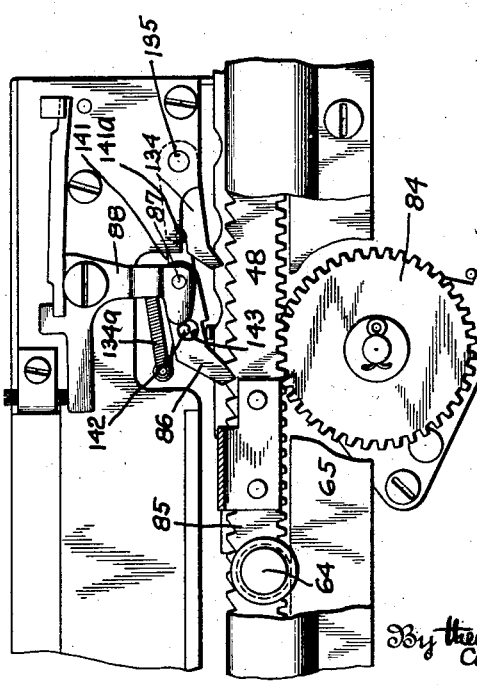
Fig. 17 is a detail of the escapement mechanism, the section being taken on line 17—17 of Fig. 9.
Figure 27:
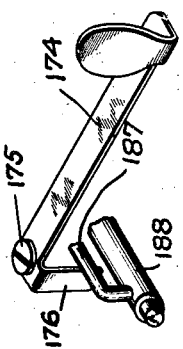
Fig. 27 is a perspective detail view of manual means for breaking the duplicator circuit.

As a result of a breaking of the circuit of the magnet 115 the magnet 115 will be deenergized and the depressed interposer returned to is normal position thus permitting the return of the plate 104 to its normal position under the influence of the spring 106 to reestablish effective engagement with the link 108. Upon depression of any interposer 95, it will swing a universal frame 132 about a shaft 133 and through suitable connections (Fig. 17) swing a dog 134 about a pivot 135 into engagement with the rack 48 to prevent movement thereof by the gear 84 and the spring drum 83. The dog or pawl 86 will be raised at this time and due to the loose mounting thereof will be moved to a position to rest on the point of the tooth 85 with which it was previously engaged. When the universal frame is released the locking dog 134 will be lifted and the rack 48 and the card carriage 7 will advance one tooth to permit punching in the next column of the card.

The escapement mechanism just referred to is of the same general nature as that disclosed in the patent to Schaaff, No. 1,426,223, granted August 15, 1922 but in order to give a better understanding of the operation of the machine a brief description of the escapement mechanism will now be made.

Secured to the bar 132 is a laterally extending finger 136 carrying an adjusting screw 137 which engages a projection 138 on the pawl or dog actuating cross-head 139 loosely mounted upon the shaft 133 and provided with oppositely extending arms 140 and 141, of which 140 is provided with a laterally projecting pin 142 for engagement with an enlarged opening 143 in the stepping dog 86 which is loosely pivoted. The opposite arm 141 is provided with a laterally extending pin 141ª extending into a slot formed in the locking dog 134 between its pivot 135 and its engaging end.

When the bar 132 is rocked on shaft 133 having at one end the pivot 87, the arm 140 on the cross head 139 will, through the pin 142, lift the stepping dog 86 out of the notch in the rack bar 48 and at the same time the arm 141 will depress the locking dog 134 into a notch between the teeth 85 on the upper edge of the rack bar 48.

At this time a spring 134ª advances the loosely pivoted stepping dog a short distance but sufficient to permit this dog to rest upon the top of the next tooth. When the locking dog is again raised out of engagement with the teeth at the upper edge of the rack bar 48 due to the upward movement of the universal bar 132 the stepping dog 86, due to the movement of the rack bar will ride down along the tooth on which it rests until the next tooth 85 strikes the end thereof and the card carriage 7 is thereby arrested.

The operation of the punches 89 may also be controlled by means of the duplicator 9 which causes selector magnets 144 to be actuated in accordance with the perforations of a pattern card or previously punched card 3 which is arranged for punching in 45 different columns. These selector magnets are twelve in number and operate the ten numeral keys and two keys, one being marked X and the other being blank, arranged to operate the two punches at the end of the row farthest from the operator.

Such operation of the keys controlled by the selector magnets may be effected by means of levers 145 having at their ends in one direction rounded heads 146 extending into slots in the shanks of the keys to be controlled and extending in the other direction substantially horizontally into the casing for the selector magnets, upwardly to a plane above the cores 147 of the magnets and then rearwardly different distances to be pivoted to brackets 148 extending downwardly from a plate 149 rigidly supported on the main frame. As indicated in Figs. 3 and 6, these brackets are arranged in three rows corresponding to the rows of the magnets and the rows of keys actuable thereby. Adjustably attached to each of these levers is an armature 150 for cooperation with the corresponding magnet.

Extending from one end of each magnet coil is a wire 151 with an insulating cover and these wires are gathered together in a cable 152 which is led through a cable conduit 153 and down through the table 74ª of the duplicator and between the table and a bottom plate 154. Here the casing of the cable ends and the wires 151 are fanned out and connected by nuts 155 to the lower ends of twelve binding posts 156 arranged in the same order as the magnets 144 and mounted in an insulating plate 157. The other ends of the magnet coils are connected through a suitable source of power to another wire 151ª (see Fig. 31) which is also included in the cable 152 and connected by nuts 155 with a thirteenth binding post 156 spaced from the other binding posts 156 as seen at the left in Fig. 9. Immediately above each binding post 156 is a tube or guide 158 mounted in a second insulating plate 159. These guides 158 are slightly contracted at their tops to retain balls or analyzing contacts 160 and these contacts are urged to the upper ends of the guides by springs 161 interposed between the balls and the heads of the binding posts.

The insulating plate 159 extends completely across the duplicator and immediately above the contacts 160 is a roller 162 having a cylindrical casing 163 of conducting material such as any suitable metal mounted on a nonconducting tubular member 164 carried by bushings 165 on a shaft 166. When a pattern or master card 3P is in the duplicator it will pass between the roller 162 and all of the contacts 160 except the one to the left of Fig. 9 which is always in contact with the cylindrical casing 163 when the roller 162 is in working position. It will be evident that when there are no perforations in the portion of the pattern card between the roller 162 and the ball contacts 160 none of the selector magnets will be energized. When, however, a perforation in the pattern comes into position over one of the contacts, the circuit of one of the selector magnets will be closed and the corresponding punch operated.

The shaft 166 is mounted in opposite sides of a frame or contact box 167 which has at opposite ends ears 168 or the like pivoted to the table of the duplicator by suitable means such as screws 169. Extending to the left (Fig. 3) from the frame 167 is a resilient plate 170 which may be held down by a latch 171 during normal operation against the action of a spring 172. In addition to the plate 170 provision is made of another plate 173 to hold a pattern card in proper position. This plate 173 is attached to the table 74ª at its end remote from the roller 162 and extends substantially to the roller 162.

When the card carriage 7 is in the position shown in Fig. 3, the latch 171 may be moved to ineffective position thereby allowing the frame 167 to be swung by the spring 172 from the position shown in Figs. 3 and 11 to the position shown in Fig. 2. The pattern or master card 3P may then be conveniently placed on the card carriage by first placing the right hand end thereof beneath the roller and the left hand end of the plate 173. The card carriage may then be moved to the right preparatory to starting the punching and the frame 167 and plate 170 may then be swung downwardly to the positions shown in Fig. 11 and there retained by the latch 171.

Such movement of the card carriage 7 to the right may be effected by means of the handle 2 at the right of the machine or of the handle 174 mounted on a pivot 175 at the left end of the card carriage 7 and having a downwardly extending lug 176 for a purpose to be brought out more clearly hereinafter. When the pattern card is placed in the card carrier when positioned at the extreme left and the duplicator is closed there would be, without provision to the contrary, actuation of the punching mechanism in accordance with any perforation in the last or 45th column of the card and also for each perforated column of the pattern card during the movement of the card carriage 7 to the position for punching in the first column of a card positioned in the punching mechanism.

For the handle 2 the desired result is obtained by providing in the duplicator circuit a contact device 177 which comprises a spring 178 secured to a fixed part of the machine and connected in the duplicator circuit. Secured to the free end of the spring 178 is a contact point 226 opposite a contact point 226 mounted on a spring 181 insulated from the spring 178 and tending to yieldably hold the left contact 226 away from the right contact point 226 and thereby provide a gap in the duplicator circuit. When however, the handle 2 returns to its normal position, the picker supporting portion of the bracket 10 will engage a lug 182 extending upwardly from a lever 183 and swing the latter about a pivot 184 to cause a downwardly extending lug 185 through an insulating member 186 thereon to flex the spring 181 and bring the contact 226 thereon into engagement with the other contact 226, thus closing the duplicator circuit at this point.

When the handle 174 is actuated to move the card carriage 7 to the right, the lug 176 presses against a bail 187 and rocks a shaft 188 on which the bail is mounted and, inasmuch as the shaft and bail extend along the path of movement of the card carriage, the shaft 188 and bail 187 will be held in operated positions as long as the handle 174 is pressed to the right. Projecting downward from the shaft 188 is a finger 189 which upon turning the shaft as just described engages an insulating member 190 on a spring 191 and by flexing the spring disengages a contact 225 thereon from a contact 225 on a spring 194, thereby making a gap in the duplicator circuit.

The bail 187 is also utilized to cut out the duplicator at any desired column and permit the rest of the perforating to be effected by manual operation of the numeral keys 8. The means for producing this effect may comprise a bar 195 having at column intervals openings 196 into which may be inserted the shank of a set screw 197 threaded in a block 198 through which the bar 195 passes and which is provided with a downwardly extending wiper or pin 199 to engage the bail 187 and cam it to one side and open the duplicator circuit at this point. It will be evident that by adjustment of the block 198 the duplicator may be cut out at any desired column. Any suitable form of settable member slidable along part 195 can be used for suppressing the duplicating action.

Provision is also made for cutting out the duplicator as soon as punching has been effected in the last or 45th column. To this end a block 200 is secured to the rack 48 at the inner face thereof to cooperate with mechanism shown in normal position in Fig. 19 and in accordance with different successive steps in the Figures 20, 21 and 22 and in plan view in Fig. 23. When the block 200 strikes an arm 201 it rocks the shaft 202 and turns an arm 203 on the shaft against the action of springs 204 and 205 to the position of Fig. 20. Mounted upon the left hand end of lever 203 by a pivot 206 is a lever 207 normally held by the spring 205 in engagement with the hub 208 of the lever 203 and having at its free end a pivot 209 on which is mounted a dog 210 normally held by a spring 211 with a lug 212 thereon in engagement with a tooth 213 in the lever 207. Resting against the lower end of the dog 210 is an arm 214 forming part of a bail 214ª on the armature pivot 118 and having a lug 215 extending beneath an insulating member 216 on a contact spring 217. The spring 217 is provided with a contact 224 normally in engagement with a contact 224 on a spring 220.

Upon engagement of the block 200 with the arm 201 the shaft 202 will be rocked and the dog 210 will be brought down on a bracket 221 on the armature 117, the spring 205 being stretched. Upon the forward movement of the armature 117 the bracket 221 will be shifted to the Fig. 21 position and the dog 210 will drop back of the same under the influence of the spring 205. Then the bracket 221 in the return movement of the armature will act through the dog 210 and against the spring 211 to swing the arm 214 to separate the contact 218 from the contact 219 and cut out the duplicator.

Referring to the circuit diagram, Fig. 31, it is broadly stated that this circuit diagram may be said to include a punch magnet circuit 262 shown by heavy lines and a duplicator circuit shown by light lines and designated by reference characters 151ª, 151, 260 and 261. It will be understood that at each punch operation, whether by means of depression of the keys or by the energization of the selector magnets 144 under the control of the duplicator, contacts 223 will be closed by the action of the interposers in the manner heretofore described to bring about the energization of the punch magnet 115. Immediately after this punch magnet 115 is energized, contacts 223 are opened by member 126, elevating link 108 free of the universal member 104. Thereafter, contacts 223 reclose under their own resiliency. The foregoing describes the operation of the punch magnet circuit.

The operation of the duplicator circuit may be thus described. The duplicator circuit is automatically closed through the pattern card 3P when holes in the card permit balls 160 to establish contact with roll 162. In order that the selector magnets 144 be energized, it is necessary that contacts 227, 226, 225, 224 in circuit with 151ª be all closed. Contacts 226 are open when the card picker is actuated. These contacts are only closed when the card picker is in fully retracted position. Contacts 225 are the contacts which are opened after the last selected column in the card has been automatically duplicated. At all other times these contacts are closed. As soon as these contacts open further duplication is prevented. Contacts 224 are contacts which are automatically opened after the 45th column has been duplicated. At all other times these contacts are closed. These contacts are provided in order to prevent repetition operations of the punching devices after the last column has been duplicated. Assuming that contacts 226, 225 and 224 are closed, current flows through duplicator circuit through source 222, through aforesaid contacts, wire 151, roll 162, balls 160, wire 151, selector magnets 144, wire 260, and through contacts 227 now closed and back to source through wire 261. The selector magnets 144 are thus energized under the control of the pattern card and thus bring about the selection and operation of the punches in the manner previously described. As previously explained in connection with the description of the operation of the punch magnet circuit 262, contacts 223 are automatically opened after each depression of the punch. In addition to the automatic opening of contacts 223, contacts 227 are also open (see Fig. 5), and in this way the duplicator circuit is automatically interrupted as soon as a selection of a punch has been effected and the punching operation completed. Just as soon as the depressor 99ª is restored to normal position the selector controlling contacts 227 reclose in order to permit the next duplicating operation. To prevent sparking at contacts 223 a condenser 255 is provided in a circuit 256 provided with a resistance 257. This condenser speeds up the operation of the punch.

Figure 28:
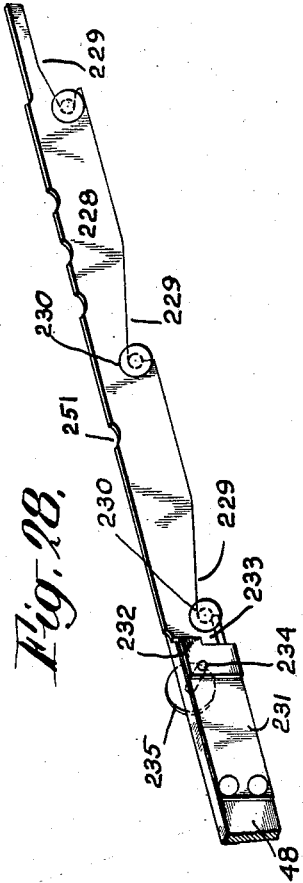
Fig. 28 is a perspective view of a skip bar and means for detachably holding it in position.

Provision is also made of a skip bar 228 having notches 229 of such shape as to facilitate the mounting of the same on the headed pins 230 on the rack 48 and the skip bar is held in position by a leaf spring 231 having a projection 232 at its end overlying a projection 233 at the end of the skip bar. To facilitate the operation of the spring 231 provision is made of a pin 234 projecting through the rack 48 and having a head 235 for operating the same. It should be noted that the notch 229 at the right of Fig. 28 is such as to prevent upward movement of that end of the skip bar and that the other notches are so shaped as to facilitate the placing of the bar 228 in position and by means of small recesses at their upper parts to assist in holding the bar in position.

It is also desirable in certain cases to limit the movement of the card carriage 7 to the right. To this end a stop 236 is mounted on a toothed bar or rack 237 and is provided with teeth 238 to mesh with the teeth of the rack and a spring 239 to hold the stop in position but to permit shifting thereof by lifting against the action of the spring. The stop 236 has an upward extension 240 which may be engaged by a stop 241 on the card carriage 7.

Upon reference to Fig. 11, it will be seen that the contact structure fixed to the table 74ª is such as to facilitate assembly of the parts. The guide tubes 158 may readily be placed in the insulating plate or member 159, and the binding posts 156 in the insulating plate 157. The balls or contacts 160 may then be placed in the tubes 158, the springs 161 inserted in the tubes, the plates 157 and 159 placed against each other in proper relation, and the assemblage secured to the lower side of the table 74ª by means of screws 242.

The machine may be operated in various ways such as the following. A pack of cards 3 may be placed in the magazine and withdrawal therefrom one by one by means of the picker is effected by means of the handle 2 which serves to operate the rod 34. Upon movement of the rod 34 to the left with the picker 4 the clutch 44 will be closed and the card carriage moved to the right far enough for the card advanced by the picker to lift the device 70 and move under the same to such an extent that the shoulder 243 of the device 70 will be supported by the finger 244 thereof resting on the card, the other end of the card being engaged by the device 72. The card carriage 7 will then be held, in its initial position for punching, by the stepping dog 86, the carriage being moved slightly past this position to enable the loosely mounted dog 86 to engage the proper tooth 85 of the rack 48 and also to assure proper engagement between the device 70 and the card. Upon release of the handle 2, the rod 34 and the picker will be returned to their normal positions, the card carriage remaining fixed and the clutch member 43 turning relatively to the clutch member 45 due to the inclination of the teeth on the two members.

The card now being in position for punching in the first column, any punch may be selected for operation by depressing the proper numeral key 8 and through the corresponding bell crank 100 advancing the proper interposer 95 over the punch which is selected. In such movement of the selected interposer the universal plate or element 104 will be swung about its pivot and the link or bar 108 will be advanced against the action of the spring 131 to bring the rear contact into engagement with the front contact 223, thus closing the punch magnet circuit. Upon energization of the punch magnet 115 in this manner, the armature 117 will be drawn forward to actuate the depresser 99ª and through the effectively positioned interposer 95 operate the selected punch 89. To prevent striking of the core of the punch magnet by the armature 117, provision is made of a toggle-like linkage 245 which, however, is not a part of the present invention and therefore will not be further described. The card carriage will then be advanced one step by the well known escapement mechanism to the next column position. These operations may be repeated until the complete punching of a card has been effected, the card carriage 7 eventually coming to rest against an adjustable stop 246. Then another card may be inserted and punched.

Instead of using the handle 2 to withdraw a card 3 from the magazine and to move the card carriage 7 to receive the card from the picker, a card may be placed in the card carriage 7 when in its leftward position and the carriage then moved into position beneath the punches 89. Inasmuch as the clutch 44 is open when the handle 2 is in its normal or home position, the carriage 7 can be moved without affecting the picker in any way. Such movement of the carriage is conveniently effected in all cases by the handle 174 which has a limited movement between stops 247 and 248. When the carriage is thus operated independently of the picker, the stop 236 may be set so as to start the punching at any column of a card. When the picker 4 is used, however, the stop 236 must be so set as to allow a full stroke of the carriage 7 for otherwise cards could not be placed therein by the picker.

While the punching is under manual control, the duplicator 9 may be in the condition illustrated in Fig. 2 to keep the duplicator circuit open. It should be understood that the duplicator circuit may be kept open in other ways as, for example, by placing an unpunched card in the duplicator. When the duplicator 9 is to be used, the card carriage is moved to its extreme leftward position and, with the parts of the duplicator positioned as in Fig. 2, a punched card or pattern card 3P is placed in engagement with the devices 74 and 76, being inserted from the left between the roller 162 and contacts 160 and beneath the plate 173. After moving the carriage 7 to starting position, the frame or box 167 is then swung downwardly and the end of the plate 170 brought against the beveled upper edge of the latch 171 to swing the latter about its pivot 249 against the action of a spring 250 which, when the plate 170 reaches the proper position, brings the hooked end of the latch over the end of the plate. After this stage of the operation a card should be introduced into the punching mechanism either by means of the picker 4 or by placing the card in the carriage in its leftward position and moving it into the punching mechanism by means of the handle 174. Then upon placing the roller 162 in operative position the corresponding selector magnet 144 will be energized and cause an interposer 95 to be moved to effective position and through link 108 close the circuit of the punch magnet 115 at contact device 225 (Fig. 31) to operate the depresser 99ª. Such operation of the depresser will act, as hereinbefore stated, to lift the link 108 sufficiently to release the same from the member 104 thus permitting the contacts 223 to close. Such lifting of the link 108 will serve to open the contacts 227 and these contacts will be kept open until the armature 117 returns to its normal position.

These operations are repeated for each column or field until the carriage engages the adjustable stop 246 in position for punching in the last or 45th column. As the carriage moves into this position the arm 201 will be engaged by block 200 on the rack 48 and the parts of the last column cut-out will assume the positions shown in Fig. 20. Upon the effective movement of the armature the parts will assume the positions shown in Fig. 21 and, upon the return movement of the armature 117, the duplicator circuit will be opened at the contact device 224 (Fig. 31) and will be kept open until the carriage 7 is again moved to the right.

In such movements to the right, it is necessary to maintain the duplicator circuit in open condition. When such return movement is effected by the handle 2, the duplicator circuit is opened at the contact device 226 as soon as the handle 2 moves the bracket 16 from its normal position and is held open until the picker reaches its retracted position. In case the new card is introduced when the carriage 7 is at the left of the machine the open condition of the duplicator is effected and maintained as heretobefore described, through bail 187 and contact device 225 (Fig. 31).

The skip bar 228 is provided with depressions 251 arranged in its upper edge at proper intervals and performs its function in a well known manner. When it is desired to release the carriage 7 from the usual step-by-step control of the escapement mechanism use is made of the key 252.

The stop 236 by adjustment to different columnar positions may be made to determine the column or field in which the initial punching is to be effected and may be said to constitute means for cutting out the punching in certain predetermined columns or fields. By this device punching in certain of the left hand columns or fields is prevented.

By selectively positioning the block or member 198, the wiper or pin 199 may be made to open the duplicator circuit after any predetermined fields have been punched.

It should be understood that the approved embodiment of the invention herein disclosed is merely illustrative of the invention and that various changes in the construction and in the arrangement of parts can be made without departing from the spirit of the invention.

We claim:—

1. In a card punching machine, the combination with a card picker to supply a card to a punching mechanism and a card carriage to receive the card from the picker and carry the same step by step through the punching mechanism, of a device for operating the card picker and moving the card carriage to card-receiving position and including an operating handle movable along the side of the machine.

2. In a card punching machine, the combination with a card picker to supply a card to a punching mechanism and a card carriage to receive the card from the picker and carry the same step by step through the punching mechanism, of a device for operating the card picker and moving the card carriage to card-receiving position and including an operating handle movable intermediate the ends of the machine and arranged for convenient right hand operation.

3. In a card punching machine, the combination with a card picker to supply a card to a punching mechanism and a card carriage to receive the card from the picker and carry the same step by step through the punching mechanism, of a device for operating the card picker and moving the card carriage to card-receiving position and including an operating handle mounted for movement from a position at the rear end of the machine to a position substantially at the middle of the machine and for return to its normal position.

4. In a card punching machine, the combination with a card picker to supply a card to a punching mechanism and a card carriage to receive the card from the picker and carry the same step by step through the punching mechanism, of a device for operating the card picker and moving the card carriage to card-receiving position and including a rod reciprocable along the side of the machine between the ends thereof and having a fixed connection with the picker.

5. In a card punching machine, the combination with a card picker to supply a card to a punching mechanism and a card carriage to receive the card from the picker and carry the same step by step through the punching mechanism, of a device for operating the card picker and moving the card carriage to card-receiving position and including a rod reciprocable along the side of the machine and a one way connection between the rod and said card carriage.

6. In a card punching machine, the combination with a card picker to supply a card to a punching mechanism and a card carriage to receive the card from the picker and carry the same step by step through the punching mechanism, of a device for operating the card picker and moving the card carriage to card-receiving position and including a rod reciprocable along the side of the machine and a one way connection between the rod and said card carriage comprising a gear meshing with teeth on one side of the reciprocable rod, a rack attached to said carriage, a second gear meshing with the teeth of said rack, and a clutch between said gears and controlled by said rod to be ineffective when said rod is in its rearward position.

7. In a card punching machine, the combination with a card picker to supply cards to a punching mechanism and a card carriage to receive cards from the picker and carry the cards through the punching mechanism, of actuating means for the picker and carriage including a rod reciprocable along the side of the machine, a fixed latch member, a spring-pressed handle on said rod normally cooperating with said fixed latch member to hold the rod in its normal position but movable to clear the fixed latch member and then to move the rod to the left.

8. In a card punching machine, the combination with a card picker to supply a card to a punching mechanism and a card carriage to receive the card from the picker and carry the card through the punching mechanism, of actuating means for the picker and carriage including a rod reciprocable along the side of the machine, a clutch having a member spring-pressed to inoperative position, a member connected with said spring-pressed clutch member and normally lying in a notch at the lower side of said rod and movable out of said notch by an inclined side wall thereof when the rod is shifted from its normal position.

9. In a card punching machine, the combination with a card-picker to supply a card to a punching mechanism and a card carriage to receive the card from the picker and carry the card through the punching mechanism, of an operating rod for the picker slidable along the side of the machine, and a bracket having an upright portion attached to said rod and a horizontal part for attachment to said picker.

10. In a card punching machine, the combination with a card-picker to supply a card to a punching mechanism and a card carriage to receive the card from the picker and hold it for operation by the punching mechanism, of an operating rod for the picker slidable along the side of the machine, a bracket attached to said rod and to said picker, a fixed latching member, and a rod-operating handle pivoted on said bracket and spring-pressed to retain it in locking relation with said latching member except when the handle is actuated to move said operating rod.

11. The combination with a card punching mechanism and a keyboard adapted to operate said mechanism of a frame carrying said mechanism and keyboard and means to support the frame in either a horizontal position or in an inclined position to permit the punch operator to conveniently operate the keyboard.

12. In a machine having a punching mechanism, the combination with a magazine to contain a plurality of cards, of a picker for supplying a card to said mechanism, said picker having a shoulder to engage the rear end of a card to be fed and an inclined end extending under cards in the magazine and being spring pressed into engagement therewith, and a follower for the cards in the magazine having a rearward extension to overlie the forward end of the picker at all times.

13. A card punching machine having a plurality of punches and selector magnets for actuating the same, a duplicator comprising a pattern card, a universal conductor member, a plurality of aligned selector contacts corresponding to the selector magnets, an additional contact member yieldingly pressed into cooperation with the universal conductor member, said last mentioned member and said contacts serving when a perforation in the pattern card exposes a selector contact to complete a punch actuating circuit through the corresponding selector magnet and means normally tending to separate said contacts and said member for preventing completion of said circuits through the magnets while the pattern card is being replaced or removed from the duplicator.

14. A card punching machine having a plurality of punches and selector magnets for actuating the same, a duplicator comprising a pattern card, a plurality of aligned selector contacts corresponding to the selector magnets, and an additional contact member, a roller having a conducting surface to bridge said contacts and serving, when a perforation in the pattern exposes a selector contact, to complete a punch actuating circuit through the corresponding selector magnets, means for positively holding the roller and contacts in operative cooperation while a pattern card is in the duplicator, and means for preventing completion of said circuit while a pattern card is being placed in the duplicator.

15. A card punching machine having a plurality of punches and selector magnets for actuating the same, a duplicator comprising a pattern card, a plurality of aligned selector contacts corresponding to the selector magnets, and an additional contact member, a roller having a conducting surface to bridge said contacts and serving, when a perforation in the pattern exposes a selector contact, to complete a punch actuating circuit through the corresponding selector magnet, and a frame in which said roller is journalled and which is mounted for movement to withdraw the roller from said contacts to permit replacement or removal of a pattern card and coincidentally prevent completion of said punch actuating circuit.

16. A card punching machine having a plurality of punches and selector magnets for actuating the same, a duplicator comprising a pattern card, a plurality of aligned selector contacts corresponding to the selector magnets, and an additional contact member, a conductor to bridge said contacts and complete a punch actuating circuit through any selector contact exposed through a perforation in the pattern member, and a carrier for said conductor mounted for movement away from said aligned and additional contacts to permit removal of a pattern card and coincidentally prevent completion of the punch actuating circuit.

17. In a card punching machine, punching means, an electrical duplicator for controlling the punching means, a picker to advance a card to the punching means, a card carriage to receive the card from the picker and move it through the punching means and for simultaneously moving a card through the duplicator, means for advancing said picker and for moving said carriage in the opposite direction to its starting position, a contact device in the duplicator circuit normally urged to open condition, means to hold said contact device in closed condition when the picker is in retracted position, a normally closed contact device in the duplicator circuit and means for automatically opening the normally closed contact when a predetermined column is reached.

18. In a card punching machine, a punching device, an electrical duplicator for controlling the punching device, a carriage for simultaneously carrying a pattern card through the duplicator and a card through the punching device, and means for automatically cutting out the duplicator when a predetermined column is reached and comprising a controlling member, a support therefor on the carriage and extending along the path thereof, and means to secure said controlling member to said support at different columnar positions.

19. In a card punching machine, a punching device, an electrical duplicator for controlling a punching device, means for simultaneously carrying a pattern card through the duplicator and a card through the punching device, and means for automatically cutting out the duplicator when a predetermined column is reached and comprising a controlling member, a support therefor extending along the path of the carriage and means to secure said controlling member to said support at different columnar positions.

20. In a card punching machine, a punching device, an electrical duplicator for controlling the punching device, a carriage for simultaneously carrying a pattern card though the duplicator and a card through the punching device, and means for automatically cutting out the duplicator when a predetermined column is reached comprising a normally closed contact device in the duplicator circuit, a bail extending along the path of movement of said carriage and having a portion to engage said contact device, a device to engage and cam the bail to one side to open said contact device, and a bar having provision to determine columnar positions of said camming device therealong to determine at what column of the card the duplicator is to be cut out.

21. In a card punching machine, a punching device comprising a plurality of punches, an electrical duplicator for controlling the punching device, a carriage for moving a pattern card through the duplicator and a card to be punched through the punching device, a handle on the carriage for returning the same to starting position, a device settable at columnar positions on said carriage, means operable by said settable device during movement of the carriage in one direction to break the duplicator circuit, and means operable by said handle to render the duplicator circuit ineffective when returning the carriage to starting position.

22. In a card punching machine, a punching device, comprising a plurality of punches an electrical duplicator for controlling the punching device, means for moving a pattern card through the duplicator and a card through the punching device, a handle for restoring the card-moving means to starting position, a device settable at different columnar positions corresponding to different columns on a card, means operable by said handle when restoring the card-moving means to starting position to render the duplicator circuit ineffective, and means operable by the settable device to render the duplicator circuit ineffective during movement of the carriage in one direction.

23. In a card punching machine, punch-selecting mechanism, a set of keys having shanks through which said mechanism is actuated, a set of selector magnets adjacent the keys and having their upper ends considerably above said keys, levers having horizontal portions connected with the shanks of said keys, offsets extending from said horizontal portions at the rear of said keys and extending above the tops of said magnets and horizontal portions extending from the upper ends of said offsets over the cores of said magnets, pivots for the free ends of said levers, and armatures above said selector magnets and secured to said levers.

24. In a card punching machine, punch-selecting mechanism, a set of keys having shanks through which said mechanism is actuated, a set of selector magnets adjacent the keys and having their upper ends considerably above said keys, levers having horizontal portions connected with the shanks of said keys, offsets extending from said horizontal portions at the rear of said keys and extending above the tops of said magnets and horizontal portions extending from the upper ends of said offsets over the cores of said magnets, pivots for the free ends of said levers, and armatures above said selector magnets and secured to said levers, said keys, magnets and pivots being arranged in staggered relation.

25. In a card punching machine, a set of punches, a universal member for operating selected punches, interposers movable between the punches and said universal member, and means for selectively moving said interposers into effective position comprising selector keys having downwardly extending shanks, and a bell crank connecting each of said shanks with the corresponding interposer.

26. In a machine of the class described, a carriage to move a card therethrough and having an escapement rack thereon, shanks projecting laterally from said rack and having heads spaced therefrom, a removable skip bar having a forked end to fit over one of said pins, and pin receiving notches each formed with an inclined side to facilitate placing the skip bar in position, an abrupt side to engage the corresponding pin and limit the movement of the skip bar and a recess at the apex of the notch to assist in holding the skip bar in position, and a latch on the escapement rack to engage and hold in position the end of the skip bar opposite the notched end.

27. In a machine of the class described, a carriage to move a card therethrough and having an escapement rack thereon, pins projecting laterally from said rack and having heads spaced therefrom, a removable skip bar having a forked end to fit over one of said pins, and pin receiving notches each formed with an inclined side to facilitate placing the skip bar in position, an abrupt side to engage the corresponding pin and limit the movement of the skip bar and a recess at the apex of the notch to assist in holding the skip bar in position, a leaf spring on said rack to engage the end of the skip bar opposite the notched end thereof and hold it in position and a member attached to said spring and extending through the escapement rack for use to press the leaf spring away from the rack to permit application or removal of said bar.

28. In a machine of the class described, in combination an escapement rack bar, a skip bar, and means for detachably securing said skip bar to the rack bar, including means on the two bars for interengagement when the bars are placed together and given a relative longitudinal movement and means including a spring latch on one of said bars for preventing a relative longitudinal movement to unlock said bars.

29. In a machine of the class described, an escapement rack bar, headed pins projecting from one face of said rack bar, a skip bar of such thickness as to fit closely between the rack bar and the heads of said pins and having a forked end to fit closely over one of said pins and adjacent its other end a pin-receiving notch at its lower edge having a long inclined side toward the forked end and a short abrupt side toward the other end of the skip bar, and a spring latch on said rack bar to engage the skip bar at the end opposite the forked end and hold the skip bar against both longitudinal and swinging movement.

30. In a machine of the class described, an escapement rack bar, headed pins projecting from one face of said rack bar, a skip bar of such thickness as to fit closely between the rack bar and the heads of said pins and having a forked end to fit closely over one of said pins and adjacent its other end a pin-receiving notch at its lower edge having a long inclined side toward the forked end and a short abrupt side toward the other end of the skip bar, means to engage the skip bar at the end opposite the forked end and hold the skip bar against both longitudinal and swinging movement, comprising a leaf spring having one end shaped to cooperate with the skip bar and secured at its other end to the rack bar, and means to flex the spring to release the skip bar.

31. In a machine of the class described, an escapement rack bar, headed pins projecting from one face of said rack bar, a skip bar of such thickness as to fit closely between the rack bar and the heads of said pins and having a forked end to fit closely over one of said pins and adjacent its other end a pin-receiving notch at its lower edge having a long inclined side toward the forked end and a short abrupt side toward the other end of the skip bar, means to engage the skip bar at the end opposite the forked end and hold the skip bar against both longitudinal and swinging movement, comprising a leaf spring having one end shaped to cooperate with the skip bar and secured at its other end to the rack bar, and means to flex the spring to release the skip bar, including a pin secured to the spring and extending through the rack bar and a button on the end of the pin.

32. In a card punching machine, punching mechanism, a duplicator for controlling the punching mechanism, a carriage for feeding a card through the punching mechanism and a pattern card through the duplicator, and means for automatically cutting out the duplicator after the last column has been punched.

33. In a card punching machine, punching mechanism, a duplicator for controlling the punching mechanism, a carriage for feeding a card through the punching mechanism and a pattern card through the duplicator, and duplicator cut out means given a preliminary setting upon movement of the carriage to the last column for actuation by the punching mechanism upon completion of the punching operation.

34. In a card punching machine, a set of punches, punch selecting means, a punch magnet, an armature for said magnet, means actuated from said armature for operating a selected punch, a duplicator for controlling said punch selecting mechanism, a carriage for feeding a card past the punches and a pattern card through the duplicator, and duplicator cut-out means given a primary setting upon movement of the carriage to its last columnar position, a secondary setting upon movement of the armature toward the magnet, and being actuated by the armature in its return movement to break the duplicator circuit.

35. In apparatus for punching cards to record data in different card fields, punches, positioning means for effecting a relative movement between the punches and the card to be punched to render the punches available for punching in different card fields, duplicating means controlled by a pattern card for determining the operation of the punches in the different card fields, means for restoring said positioning means to starting condition, a device settable for different selected columns, and means controllable both by the restoring means and the settable device for suppressing the action of the duplicator.

36. In apparatus for punching cards to record data in different card fields, punches, positioning means for effecting step by step relative movement between the punches and a card to render the punches available for punching in different card fields, electrical duplicating means controlled by a pattern card for determining the punching in the different card fields, and means for cutting out the duplicator circuit after punching has been effected in the last column.

37. In apparatus for punching cards to record data in different card fields, punches, positioning means for effecting relative movement between the punches and a card to render the punches available for punching in different card fields, electrical duplicating means controlled by a pattern card for determining the punching in the different card fields, means for cutting out the duplicator circuit after punching has been effected in the last column, said cutting out means being given a preliminary setting when the punches and card are positioned for punching in the last column of the card, a secondary setting when the punches operate, and being operated during the return movement of the punches to effect the cut-out action.

In testimony whereof we hereto affix our signatures.

FRED L. LEE.
BURDETT H. PHILLIPS.

DISCLAIMER 1,772,186.—*Fred L. Lee*, Binghamton, and *Burdett H. Phillips*, Endicott, N. Y. DUPLICATING PUNCHING DEVICE. Patent dated August 5, 1930. Disclaimer filed December 5, 1930, by the assignee, *The Tabulating Machine Company*.

Hereby enters this disclaimer to claim 11 in said specification which is in the following words, to wit:

11. The combination with a card punching mechanism and a keyboard adapted to operate said mechanism of a frame carrying said mechanism and keyboard and means to support the frame in either a horizontal position or in an inclined position to permit the punch operator to conveniently operate the keyboard.

[*Official Gazette December 23, 1930.*]